United States Patent [19]

DeVaney et al.

[11] Patent Number: 4,698,839

[45] Date of Patent: Oct. 6, 1987

[54] MOBILE TELEPHONE SWITCHING OFFICE

[76] Inventors: David B. DeVaney, 111 Sweetwater Blvd. N., Longwood, Fla. 32779; Donald J. Harper, 140 Hilltop Pl.; Thomas D. Short, 1005 Woodall Dr., both of Altamonte Springs, Fla. 32701

[21] Appl. No.: 870,151

[22] Filed: Jun. 3, 1986

[51] Int. Cl.[4] ............................................. H04Q 7/04
[52] U.S. Cl. ........................................ 379/60; 379/59; 455/33
[58] Field of Search ...................... 379/59, 60; 455/33, 455/34

[56] References Cited

U.S. PATENT DOCUMENTS 4,398,063 8/1983 Hass et al. .............................. 379/60
4,599,490 7/1986 Cornell et al. ......................... 379/60

FOREIGN PATENT DOCUMENTS 0167951 1/1986 European Pat. Off. .............. 379/60
0154828 9/1984 Japan .................................... 379/60

Primary Examiner—Robert Lev
Attorney, Agent, or Firm—Cesari and McKenna

[57] ABSTRACT

A mobile telephone switching office for switching telephone calls among landline subscribers and mobile subscribers, the office controlling the call origination, termination and release of call from both the landline and the mobile subscribers, and providing a separation between the elements associated with each function for regulatory purposes. The mobile telephone switching office includes a time slot interchange mobile switch network for switching voice information among landline and mobile subscribers. A call control processor controls the switch network. Calls with a mobile subscriber are controlled by the cell site through a serving area controller, which transfers control messages between one or more cell sites to which it is connected and the call control processor. The serving area controller maintains records of the mobile voice channels available through the cell sites connected to it and the mobile calls taking place at any given time.

7 Claims, 24 Drawing Figures

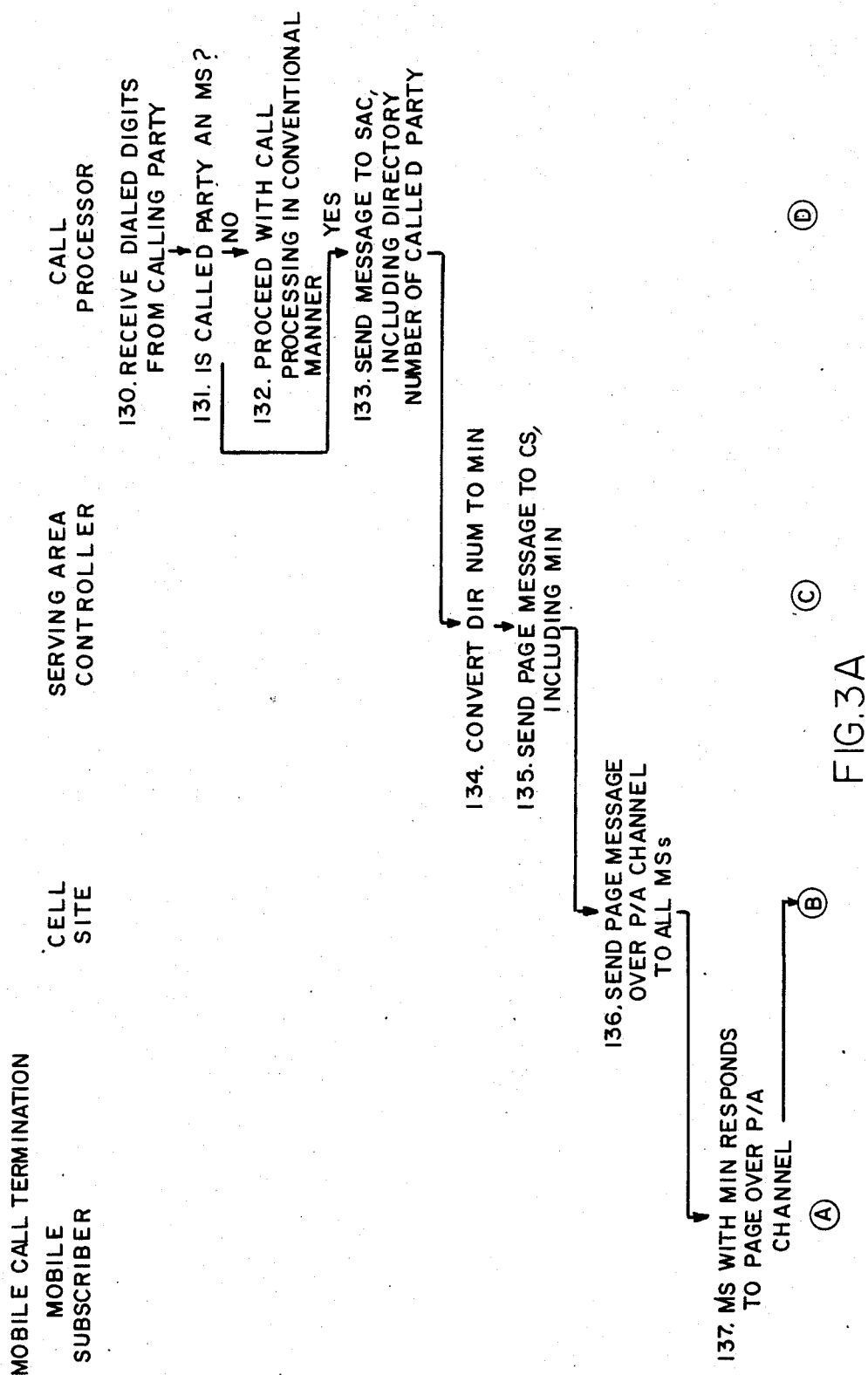

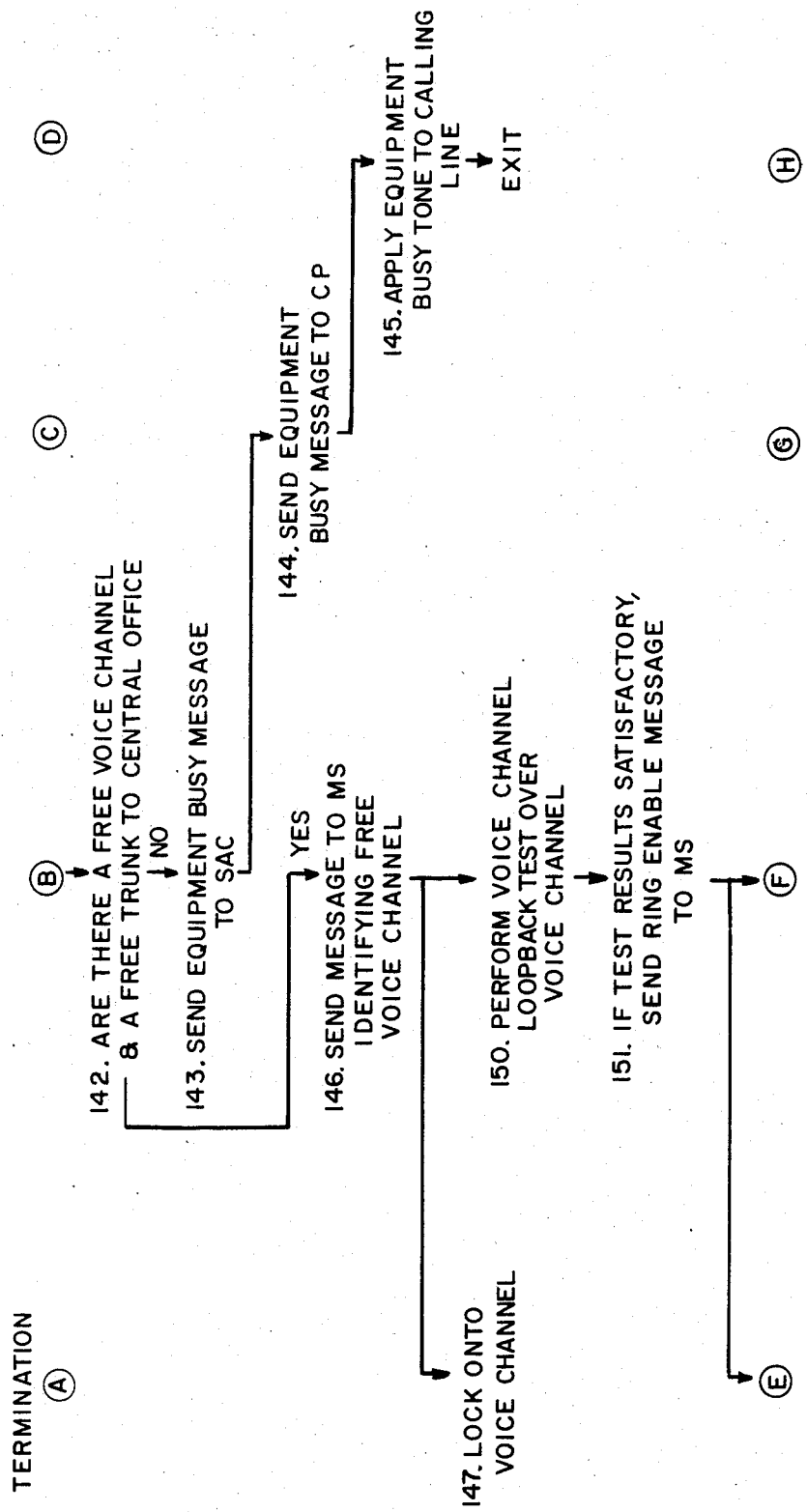

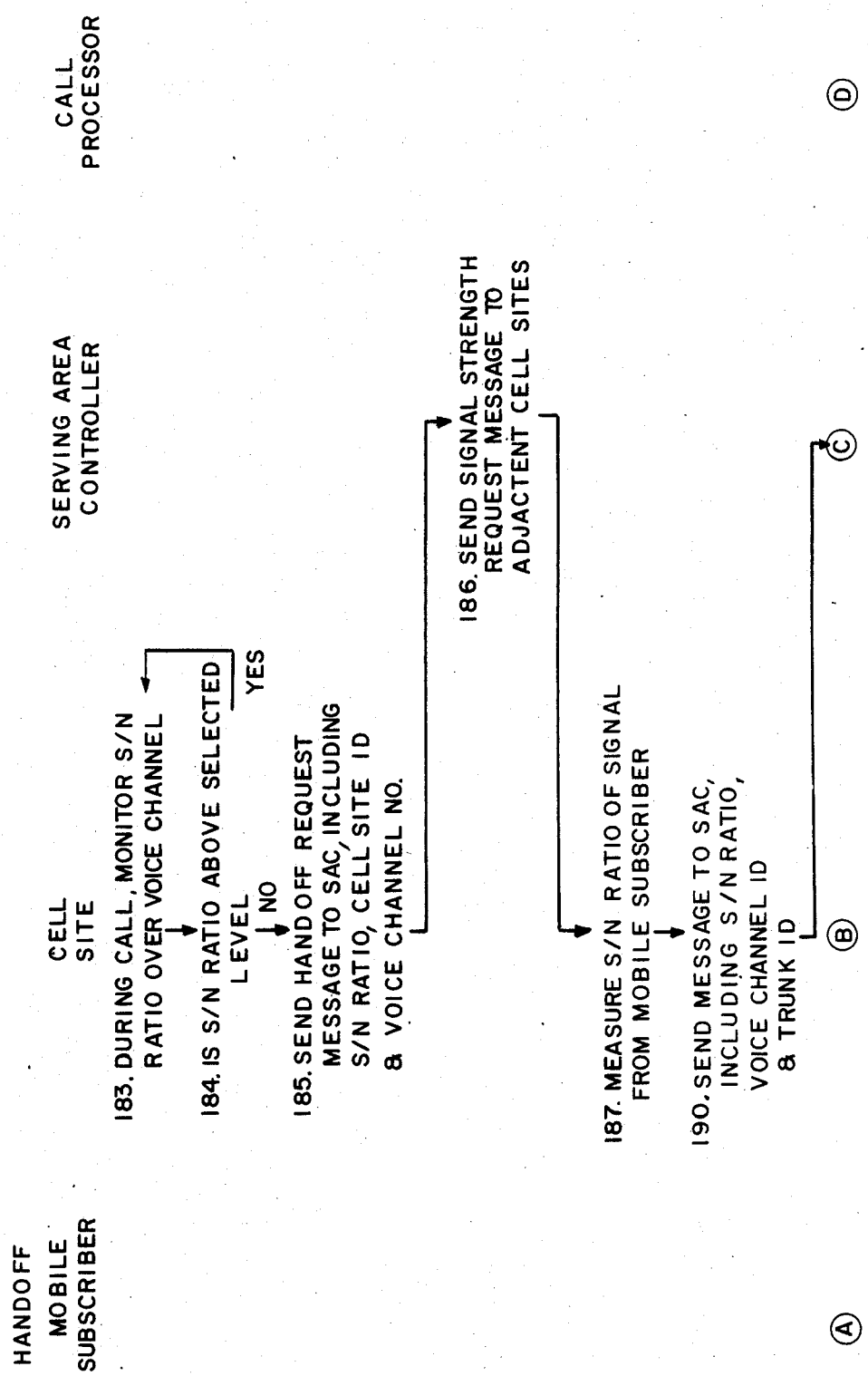

DATA & ADDRESS BUS STRUCTURE

HEAD CELL LOADING ROUTINE

300. ARE CONTENTS OF LOAD PTR GREATER THAN CONTENTS OF UNLOAD PTR ? — YES →

↓ NO

304. SUBTRACT CONTENTS OF UNLOAD PTR FROM CONTENTS OF LOAD PTR, RESULT IS AVAILABLE SPACE IN HEAD CELL

↓

301. SUBTRACT CONTENTS OF LOAD PTR FROM CONTENTS OF LAST PTR. RESULT IS AVAILABLE SPACE AT END OF HEAD CELL

↓

302. SUBTRACT CONTENTS OF FIRST PTR FROM CONTENTS OF UNLOAD PTR. RESULT IS AVAILABLE SPACE AT BEGINNING OF HEAD CELL

↓

303. SUM VALUES OF AVAILABLE SPACES AT END & BEGINNING OF HEAD CELL, RESULT IS AVAILABLE SPACE IN HEAD CELL

↓

305. IS LENGTH OF MESSAGE GREATER THAN AVAILABLE SPACE IN HEAD CELL ? — NO →

↓ YES

306. RETRY LATER

CHANNEL CONFIGURATION
BUFFER
(CCB)

| STATE | |
|---|---|
| MOBILE INFO TBL PTR | — 330 |
| STATION CLASS | — 333 |
| SIGNAL STRENGTH | — 334 |
| SIG STR RESPONSE CNT | — 335 |
| CORRESPONDING CCB DURING HANDOFF | — 336 |
| ABSOLUTE CHANNEL NO | — 332 |

FIG. 11A

MOBILE INFO TABLE

| STATE | — 334 |
|---|---|
| CCB ENTRY PTR | — 331 |
| MOBILE ID NO | — 340 |
| MOBILE SER NO | — 341 |
| CP EQUIPMENT NO | — 342 |
| PTR NEXT ENTRY | — 343 |

FIG. 11B

MOBILE TELEPHONE SWITCHING OFFICE

BACKGROUND OF THE INVENTION

1. Field of the Invention

The invention relates generally to the field of telephony switching systems, and more particularly to such systems for use in cellular mobile telephone systems. The invention provides a new and improved system that includes mechanisms both for connecting to and controlling an unregulated cellular system and for connecting to a regulated public telephony network so that the same system can perform both functions and be sufficiently divided to insure that the unregulated cellular portion is not subsidized by the regulated landline portion.

2. Description of the Prior Art

Cellular radio-telephone systems have recently been introduced in a number of areas to provide telephone coverage for people who need to have access to telephones for communications, but who must be outside of their offices for long periods of time and are otherwise unable to get to elephones that are hard-wired to a central office over conventional telephone lines. Users of cellular systems may include, for example, people of any of a number of occupations, such as salesmen, repairmen, or delivery men, who mus do considerable amounts of automobile travel and who may not be near a conventional land-line telephone when their supervisors or dispatchers may need to communicate with them.

In the past, radio-telephone systems have provided limited and expensive service to a number of areas. In prior systems, a radio signal from a single high-power transmitter covered an entire area. The number of subscribers who could use the system at any one time was limited by the number of channels provided for radio-telephone service, which, in turn, was limited by the amount of the radio frequency spectrum that was allocated to radio-telephone usage in the area and the bandwidth of each channel. In most prior radio-telephone systems, the number of channels, and thus the number of subscribers in a region who could use the system at any one time was also small.

In cellular radio-telephone services, however, an aras is divided into a plurality of small regions, or "cells", covered by a low-power transmitter. Currently, cellular radio-telephone service is provided in frequency bands between 825 and 845 MHz and between 870 and 890 MHz. The higher frequency band is used for down-link transmissions, that is, transmissions from the "cell site" for reception by a mobile subscriber. The "cell site" is the location of the radio frequency transmitter, or, more specifically, the location of the antenna, from which transmissions are effected for the cell. The lower frequency band is used for up-link transmissions, that is, transmissions from the subscriber for reception by the receiving equipment which is also located at the cell site.

Each of the frequency bands allocated to cellular radio-telephone service in an area is divided into two parts, with one-half being reserved for the local land-line telephone company and the other half being franchised to a competing radio-telephone service provider. Each channel has a bandwidth of thirty kilohertz, allowing for 666 channels in the twenty-megahertz bands, with 333 being provided to the telephone company and the same number being provided to the franchisee. Most of the channels are used for voice transmission, but some, including at least one channel in each cell, are used as a paging/access channel, which is used for transmission of control information between the cell site and mobile subscribers.

To avoid interference between transmissions in adjacent cells, the entire twenty megahertz bandwidth is not available in all of the cells. Instead, cells are assigned certain of the channels, such that adjacent cells are not assigned the same channels. Typically, the cells may be arranged so that each cell is surrounded by six others, and so each cell may have, for example, forty-eight channels provided by each of the telephone company and franchisee (that is, 333 channels divided by seven). The actual topography of the cells and number of channels in the various cells may vary depending on a number of factors. As subscribers travel between cells, the channels in which they transmit and receive the telephonic voice signals are changed in a manner and by circuitry known in the art. Thus, ninety-six simultaneous calls can take place in each cell, one over each of the channels. Using prior radio-telephone arrangements, with the same bandwidth signals and bands, only ninety-six calls could take place in an entire area.

Currently, the billing rates for land-line telephone services throughout the United States are regulated by various state and local departments of public utilities. These rates depend, in part, on the amount of capital equipment that has been dedicated by the telephone company for use in the public switching network for the landline subscribers. However, the rates for cellular radio-telephone service are not regulated, and so the departments of public utilities require that the telephone companies maintain a rigid demarcation between the investments for the regulated activities and their investments in the unregulated areas such as cellular radio-telephone services. This is required to make sure that they do not include in their regulated rate requests investments that are actually used for their unregulated activities.

SUMMARY OF THE INVENTION

The invention provides a new and improved hybrid switching office for use in a telephony network that performs both switching for land-line subscribers in the public switching network, and also provides common control of cell sites in the area's cellular radio-telephone system, and maintains sufficient distinction between the two to satisfy current regulatory requirements for differentiating between the regulated and unregulated environments.

In brief summary, the new switching office includes a central office, which includes a time slot interchange matrix switch network that switches calls among land-line subscriber lines and trunks under control of a call processor. At least some of the trunks are connected to cell sites for carrying voice information to and from the cell sites. Each cell site includes a cell site controller which controls the operations of the cell site and transmits messages to the central office to identify origination, termination, and release and to request hand-off of a mobile subscriber when the signal from the subscriber is at a sufficiently low level. When an event occurs in which a cell site is to allocate a voice channel to a mobile subscriber, such as when mobile subscriber requests origination of a telephone call, when a termination is requested to a mobile subscriber, or when a mobile subscriber is being handed off from another cell, the cell site selects both the voice channel and the trunk to the central office for the call. The cell site then transmits the trunk identification information to the central office by means of an appropriate message.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 11, comprising FIGS. 11A and 11B, detail certain data structures used by a serving area controller.

DETAILED DESCRIPTION OF AN ILLUSTRATIVE EMBODIMENT

Figure 1:
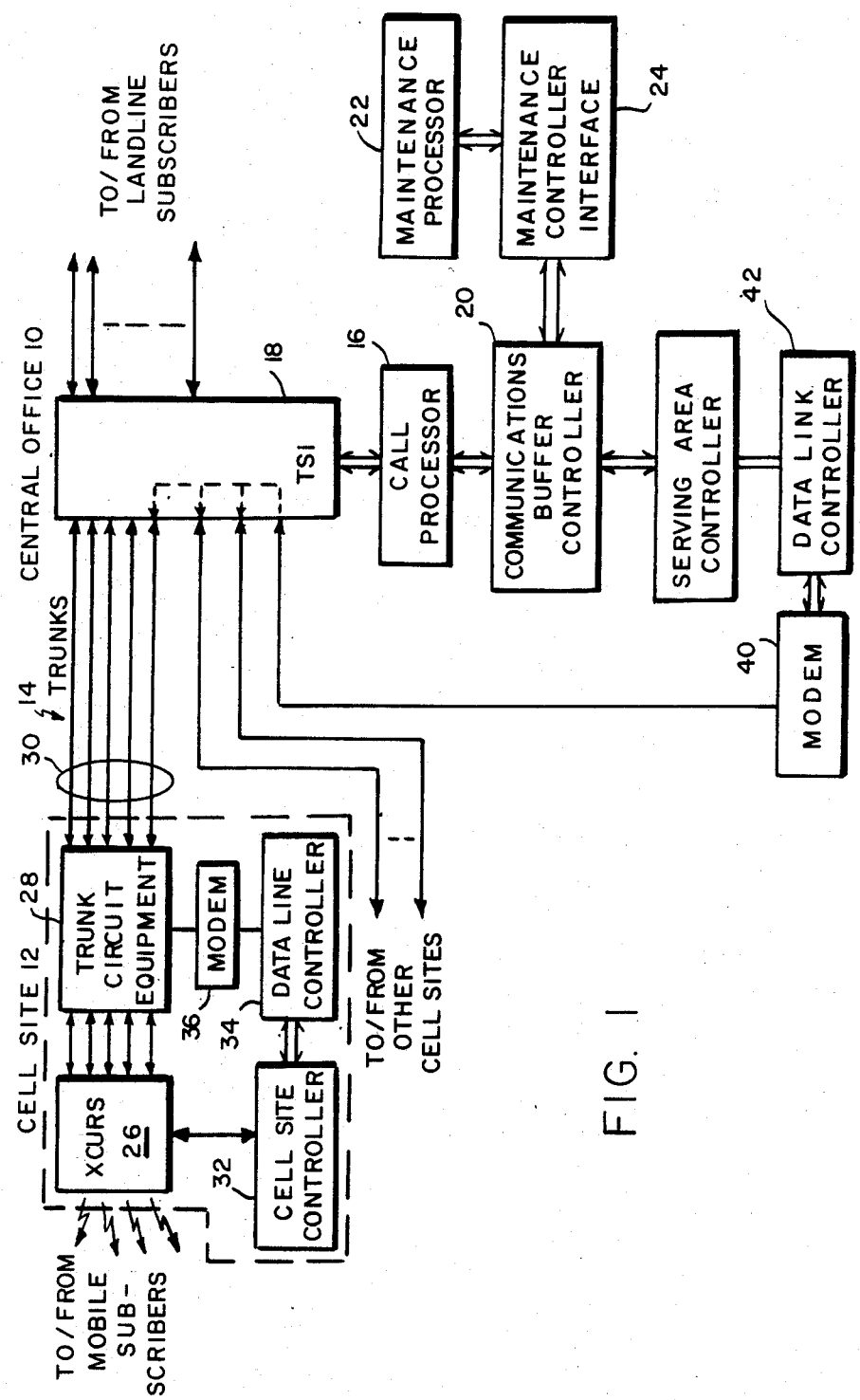
FIG. 1 is a general block diagram of a telephony network constructed in accordance with this invention.

FIG. 1 depicts a telephony system that include a central switching office 10 connected to one or more cells sites 12 (one cell site is depicted in the FIG.) through an interface 14. The central switching office may be as depicted in U.S. patent application Ser. No. 507,935, filed June 23, 1983, U.S. Pat. No. 4,393,495, and U.S. Pat. No. 4,523,308. A call control processor 16 controls the cell processing operations of the system. A time slot interchange matrix switch network 18, under control of call control processor 16 performs subscriber line and trunk switching operations through central office 10. The call control processor also transmits and receives control and sense supervisory information through, for example, a communications buffer controller 20.

As is common in telephony systems, certain elements of the system may be duplicated or redundant so that if one elements fails, the redundant element may take over. A maintenance processor 22, which connects to the rest of the central office through a maintenance communications interface 24, performs maintenance and diagnostic operations on the system and detects when one of the elements fails. The maintenance processor can cause the redundant element to substitute for a failed element, in some instances may take certain actions to attempt to correct the defects in the failed element, and will also provide certain diagnostic information to a maintenance repairman.

Each cell site 12 includes a plurality of transceivers generally designated by the reference numeral 26. Each transceiver transmits and receives voice information to and from a mobile subscriber on a channel in the appropriate 825 and 845 MHz and 870 and 890 MHz radio frequency bands. Radio frequency signals are received from the mobile subscribers at the cell site through an antenna system (not shown). Each transceiver demodulates the signals in one of the channels to generate an audio frequency signal representing the voice information carried on that channel. The audio frequency signals are then coupled to conventional trunk circuit equipment 28, which, in turn, couples each voice signal over one of the trunks, generally designated by reference numeral 30, in interface 14. The trunks then carry the audio frequency voice signals to the central office 10.

The trunks 30 also carry voice information, in the form of audio-frequency voice signals, from the central office 10 to the cell site 12. The trunk circuit equipment 28 receives the voice signals and couples them to the transceivers 26, with one voice signal being coupled to each transceiver. The transceiver uses the audio frequency signal in a known manner to modulate the radio frequency signal that is transmitted as one of the channels. The modulated radio frequency signals are then broadcast into the cell through the antenna system (not shown).

The nature of the trunk circuit equipment 28 depends on the type of trunks 30 connect between cell site 12 and central office 10. If the trunks 30 are analog trunks, the trunk circuit equipment 28 may operate primarily to amplify and filter the audio frequency signals. On the other hand, if the trunks 30 are digital trunks, the trunk circuit equipment 28 may convert analog signals from the transceivers 26 to digital form for transmission over trunks 30, and may also convert the digital signals from trunks 30 to analog form for tranmission to the transceivers 26. If the trunks 30 are digital T-1 spans, the trunk circuit equipment 28 may also multiplex voice signals from a plurality of transceivers 26 into successive time slots on a single T-1 span. Similarly, the trunk circuit equipment 28 connected to a single T-1 span receives the multiplexed signals in successive time slots, demultiplexes them, after converting them to analog form, and transfers them to the respective transceivers 26.

Trunks 30 also carry sense and control supervisory information, in the form of messages, between the central office 10 and the cell site 12, and specifically between the cell processor 16 and a cell site controller 32 which controls the operations of each cell site. The cell site controller 32 generates messages that it supplies to a data link controller (remote) 34. The data link controller (remote) 34 queues the messages and couples them, in serial form, to a modem 36. The messages as generated by the cell site controller 32 and as queued by the data link controller (remote) 34 are in digital form. The modem 36 generates audio tones representing the digital bits comprising the messages as they are received from the data link controller (remote) 34.

The tones generated by the modem 36 are then coupled to the trunk circuit equipment 28, where they are then transmitted over trunks 30. The tones may be transmitted over a trunk that is dedicated to that purpose; alternatively, they may be multiplexed into one or more time slots over a trunk that also carries voice signals in other time slots.

The time slot interchange 18 switches the tones to a modem 40 at the central office 10, which regenerates the digital message and couples it to a data link controller (host) 42. The data link controller (host) 42 receives the messages from a plurality of cell sites 12 and makes them available to a serving area controller 44. One serving area controller 44 is depicted in FIG. 1, but a central office 10 may include a plurality of serving area controllers, each of which receives messages from a selected number of cell sites 12. The serving area controller, in turn, collects messages from several data link controllers (remote) 34 and couples them through the communications buffer controller 20 to the cell processor 16 for processing. The serving area controllers also maintain certain databases and perform some processing in connection with calls involving a mobile subscriber, as explained below (see FIGS. 11A and 11B).

The cell site controller 32 also receives messages from central office 10 over a similar path. The call processor 16 or serving area controller for that cell site generates messages and deposits them with the data link controller (host) 42. For messages that originate with the call processor 16, those messages are supplied to the serving area controller 44 which then couples them to the data link controller (host) 42. The data link controller (host) 42 queues the messages and sends them to modem 40, which couples them through TSI 18 to the appropriate trunk 30. The trunk circuit equipment at the cell site 12 which is to receive the message couples the message to modem 36, which, in turn, transfers the message to the data link controller (remote) 34. The data link controller (remote) 34 then makes the message available to the cell site controller 32.

With this background, the various operations of the elements depicted in FIG. 1, and the messages transferred among them, will be explained in connection with FIGS. 2 through 5. These Figs. detail the following operations:
A. call origination by a mobile subscriber (FIG. 2),
B. call termination to a mobile subscriber (FIG. 3),
C. call release to a mobile subscriber (FIG. 4), and
D. call handoff between two cells (FIG. 5).

Figure 2A:
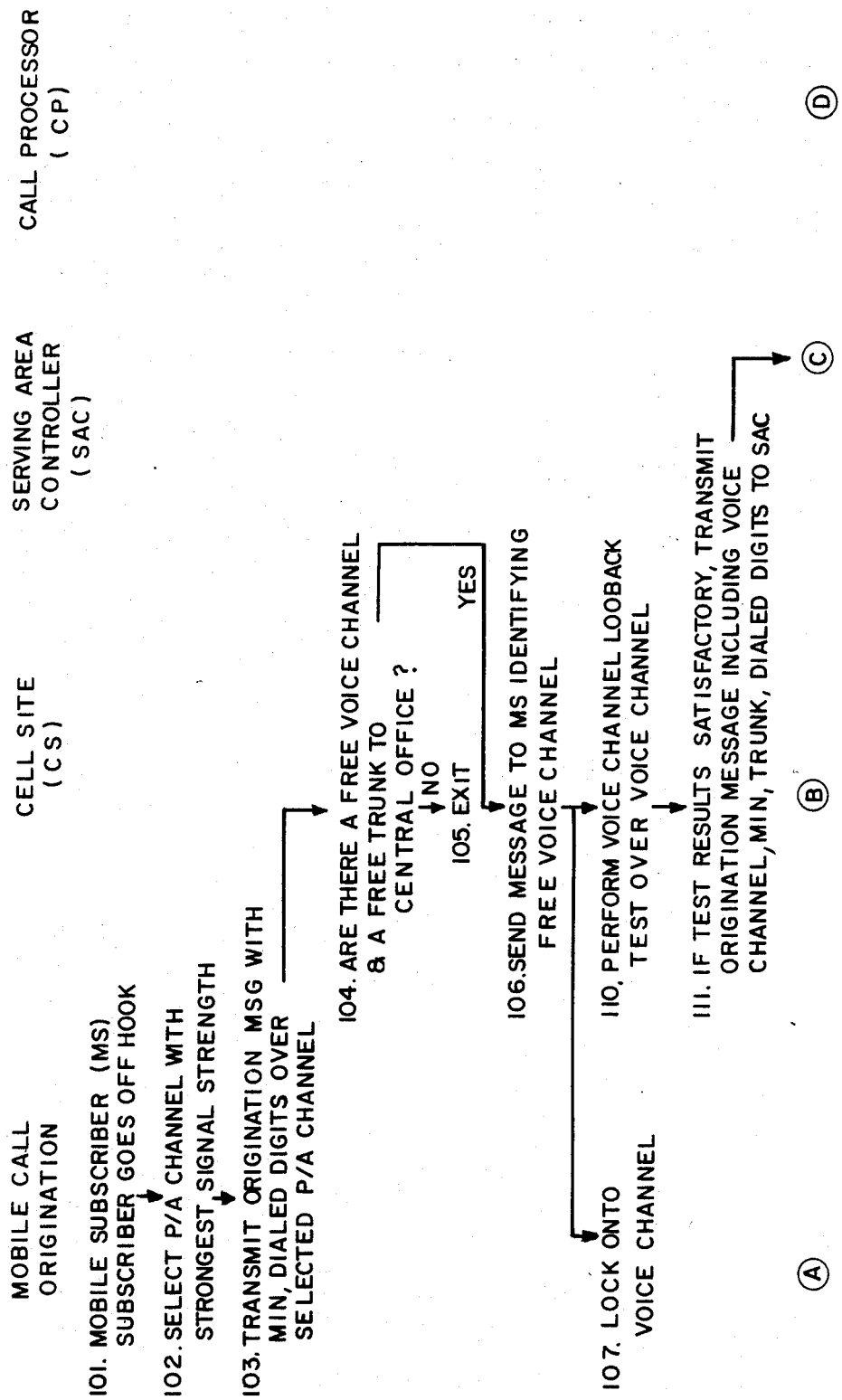
FIG. 2, comprising FIGS. 2A and 2B, contain a flow diagram depicting the operations of, and the messages transmitted among, the various portions of the network depicted in FIG. 1 in response to a call origination request by a mobile subscriber.
Figure 2B:
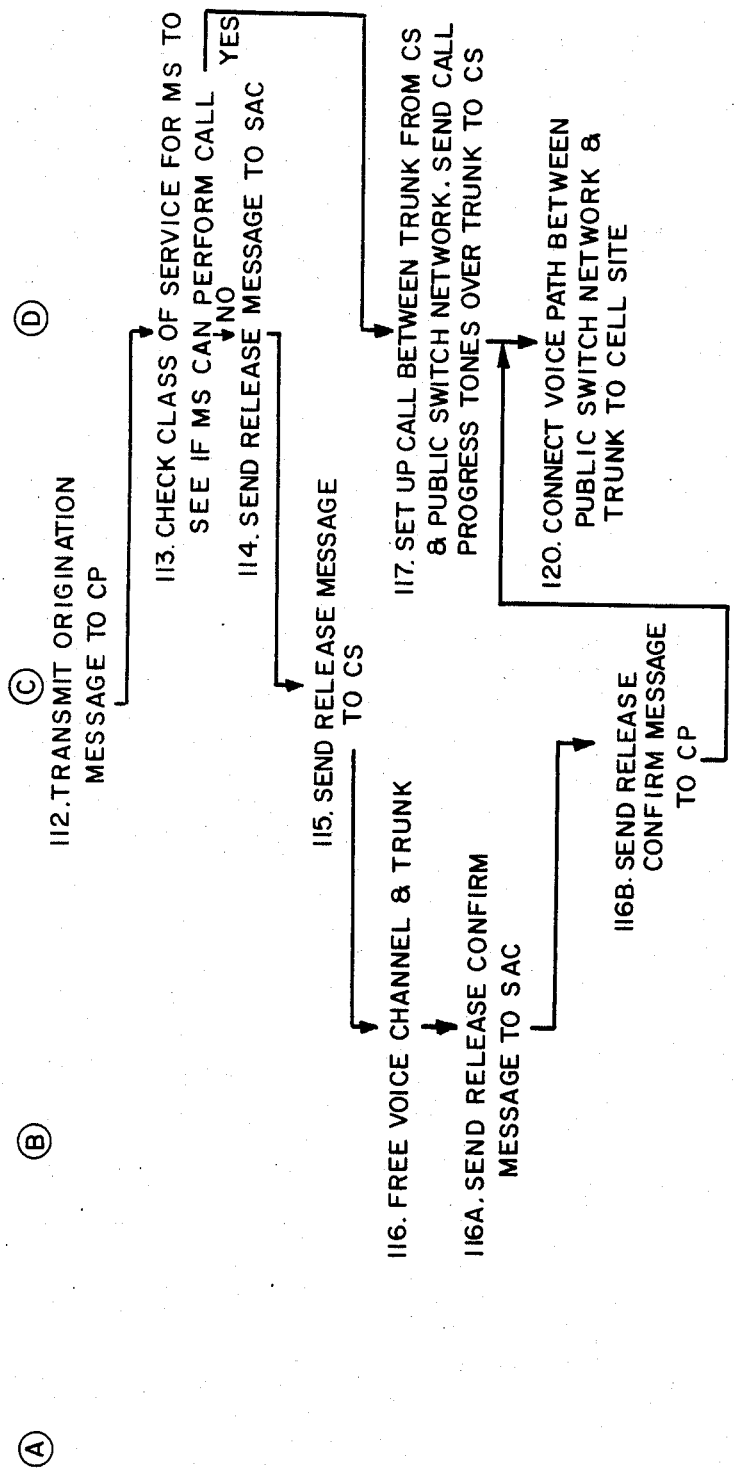
Figure 3C:
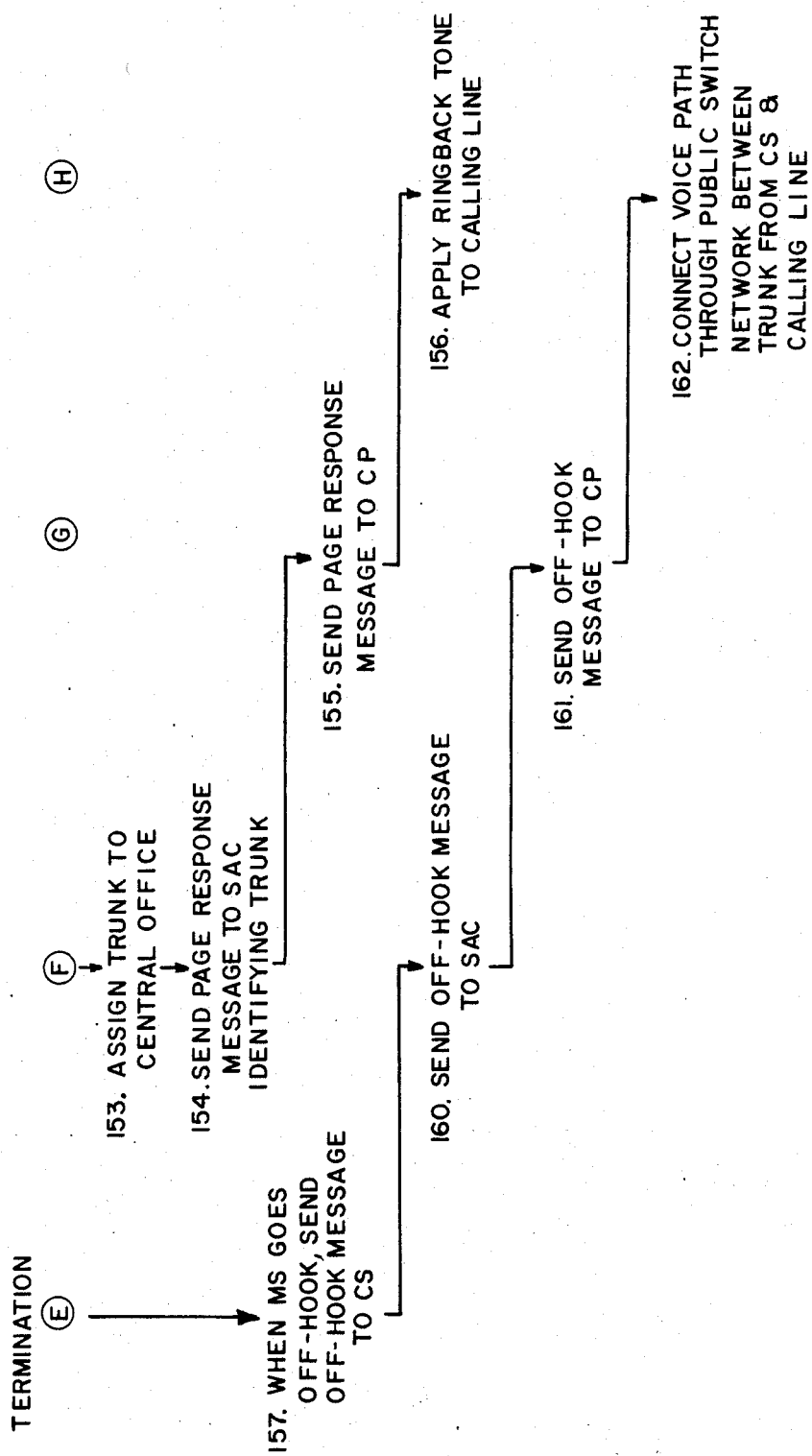
FIG. 3, comprising FIGS. 3A through 3C, contain a flow diagram depicting the operations of, and messages transmitted among, the various portions of the network depicted in FIG. 1 in response to a call termination request to a mobile subscriber.

With reference to FIG. 2, specifically FIG. 2A, when the mobile subscriber goes "off-hook", or more particularly the mobile analog to a land-line subscriber going off-hook (step 101), the operator initially supplies the dialed digits of the called party and presses a SEND button. In response to the depression of the SEND button, the mobile subscriber initially monitors the frequencies for all of the paging channels. The paging channels are the channels used by the cell sites to broadcast control supervisory information into the cell. The mobile subscriber selects the paging channel with the strongest signal (step 102). This channel is associated with the cell site with which the mobile is most likely to have the best voice channel communications. The mobile subscriber then transmits an origination message (step 103) over the access channel which is associated with the selected paging channel. The origination message requests that a voice path be set up to the subscriber identified by the dialed digits, which are transmitted in the origination message. The origination message also includes the mobile's identification number (MIN), which is related to the mobile subscriber's directory number by a conventional algorithm.

In response to the receipt of the origination message from the mobile subscriber, the cell site 12, more particularly the cell site controller 32, determines whether it has a free voice channel and a free trunk 30 to the central office 10 (step 104). If the cell site is unable to provide both the free voice channel and the free trunk, it will be unable to provide a communications link between the mobile subscriber and the central office 10, and it will not respond to the request from the mobile subscriber (step 105).

If, on the other hand, the cell site does have both a free voice channel and a free trunk, it sends a message to the mobile subscriber identifying the free voice channel which has been reserved for the mobile subscriber (step 106). In response, the mobile subscriber locks onto the voice channel (step 107). A short time after sending the message to the mobile subscriber, the cell site performs a loopback test over the voice channel (step 110). If the test results are not satisfactory, the cell site will ignore the origination request from the mobile subscriber. The mobile operator may then retry the call later. However, if the results of the loopback test are satisfactory, the cell site transmits an origination message to the serving area controller 44 including the mobile subscriber's mobile identification number, the dialed digits, and the assigned trunk and voice channel for the call.

On receiving the origination message from the cell site 12, the serving area controller 44 transfers the message to the call control processor 16 (step 112), which first checks the mobile subscriber's class of service to determine whether the class of service is sufficient to support the kind of call being requested (step 113). If not, a release message to that effect is sent to the serving area controller 44 (step 114), which in turn sends a corresponding message to the cell site (step 115). The cell site controller 32 then frees the voice channel and trunk for use on another call (step 116). The release message effectively prevents the mobile subscriber from initiating a call which his class of service does not permit.

If, in step 113, the mobile subscriber's class of service was sufficient to permit the mobile subscriber to place the call, the call control processor 16 sets up a voice path through the time slot interchange matrix switch network 18 between the called party and the trunk connecting the cell site and central office 10 (step 117). While this is occurring, the call control processor enables call progress tones, such as a ring-back tone, to be transmitted over the trunk to the cell site. When the called party answers, the call control processor 16 connects the voice path between the called party and the trunk to the cell site (step 120) to allow the call to proceed.

The mobile call termination sequence is used, when a calle party is a mobile subscriber, to locate the mobile subscriber, determine the cell site that will initially handle the call, and establish a voice path from the central office and through the cell site 12 to the mobile subscriber. With reference to FIG. 3A, the call control processor 16 receives the dialed digits from the calling party, which may be a landline subscriber or another mobile which just initiated an origination sequence as described above in connection with FIG. 2 (step 130). The call control processor initially determines whether the called party is a mobile subscriber (step 131), and, of not, proceeds to process the call in a conventional manner (step 132). The operations performed in conventional call processing are described in connection with the above-mentioned patent application Ser. No. 507,935 and U.S. Pat. Nos. 4,393,495, and 4,523,308.

If, in step 131, the call control processor 16 determined that the dial digits identify a mobile subscriber, it generates a termination message which includes the dialed directory number of the called party, which message it sends to the serving area controller 44 (step 133). In response to the termination message, the serving area controller 44 translates the directory number into the mobile identification number of the called mobile subscriber (step 134). The serving area controller 44 then generates a page message, which it sends in broadcast fashion to all of the cell sites 12, specifically to the cell site controllers 32, of all of the cell sites attached to it (step 135). The page message includes the mobile identification number (MIN) of the called mobile.

In response to the receipt of the page message, each cell site sends a page message over its down-link paging channel of the paging/access channel pair (step 136). If a mobile subscriber receives the paging message, it responds over the up-link access channel (step 137). A cell site which does not receive the page response from a mobile subscriber periodically repeats the page message.

The cell site that receives the page response then sends the serving area controller a message to thaat effect (step 140). The serving area controller 44 then sends messages to its cell sites enabling them to stop repeating the page message (step 141).

In addition, the cell site 12, specifically the cell site controller 32, also determines if it has a free voice channel and a free trunk 30 to the central office 10 (step 142). If it does not, it sends an equipment busy message to the serving area controller 44 (step 143), which relays the message to the call controll processor 16 (step 144), which in turn applies an equipment busy tone to the calling line (step 145). At this point, the calling party can retry the call at a later time.

If, in step 142, the cell site controller 32 determines that it has a free voice channel and free trunk 30, it sends a message to the mobile subscriber which identifies the free voice channel (step 146). The mobile subscriber locks onto this channel for voice communications with the cell site (step 147). The cell site then performs the voice channel loopback test (step 150) to verify that voice communications over the voice channel are satisfactory. If the test is successful (step 151), the cell site controller 32 sends a message to the mobile subscriber enabling it to ring the mobile operator.

Contemporaneously with the transmission of the ring enable message in step 151, the cell site controller 32 assigns the trunk to carry the call (step 153, FIG. 3C) and sends a ringback message to the serving area controller 44 identifying the trunk to carry the voice communications between the mobile subscriber for the call (step 154). The serving area controller 44 relays the ringback message to the call control processor 16 (step 155), which applies a ringback tone to the calling line (step 156).

When the mobile operator responds to the ring, the mobile subscriber sends an off-hook message to the cell site over the uplink channel of the paging/access channel (step 157). The cell site (in step 160) and serving area controller 44 (in step 161) sequentially relay the off-hook message to the call control processor 16, which connects a voice path through the public switch network between the trunk from the cell site and the calling line (step 162) to allow the call to proceed.

After a call is set up, two primary types of events during a call require activity by the cell site 12 and central office 10, namely, call release, which occurs when a party to a call goes on-hook, and call hand-off, which occurs when the mobile goes from one cell to another, or more specifically, when the voice signal from the mobile falls below a selected strength.

Figure 4A:
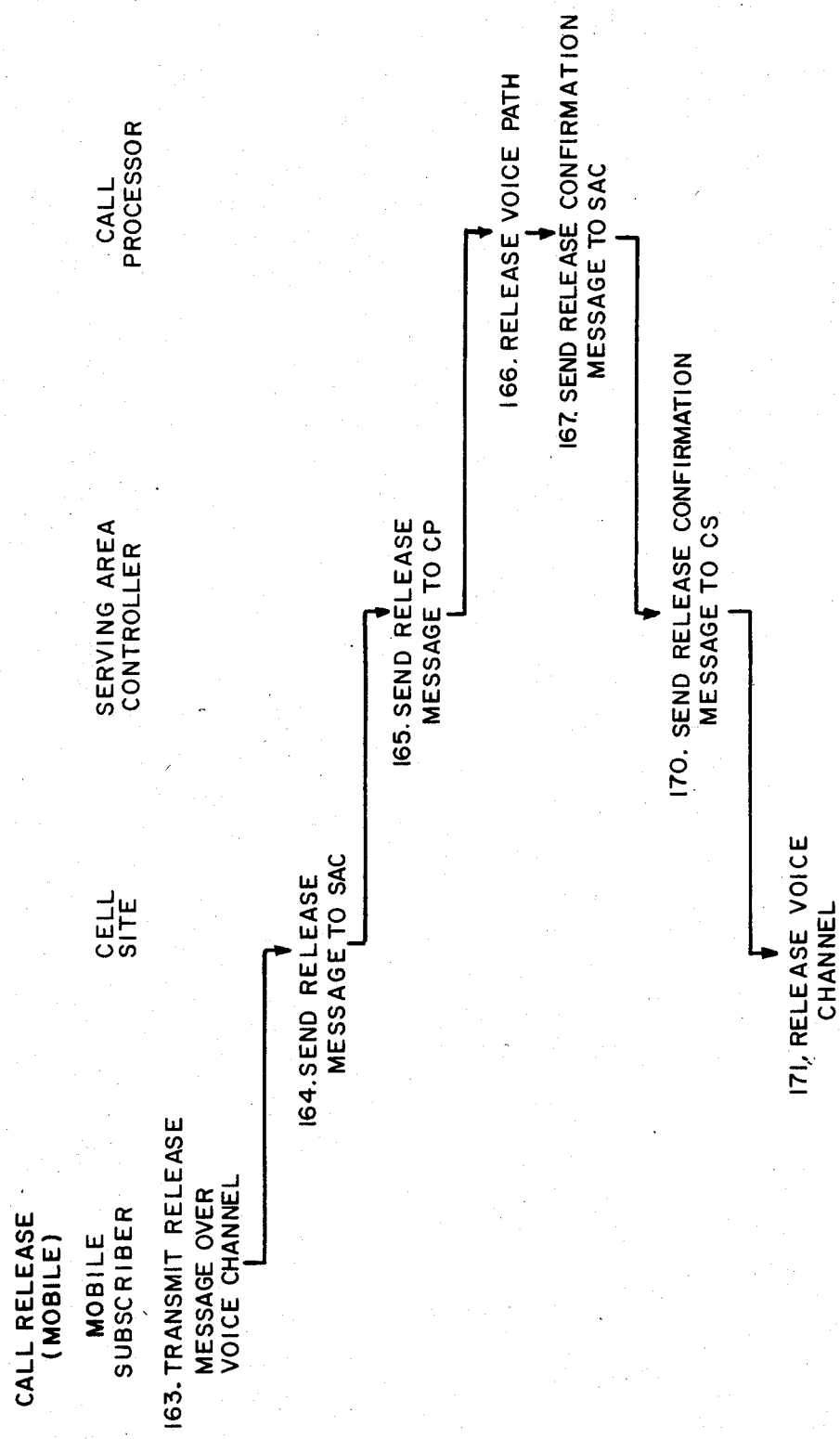
FIG. 4, comprising FIGS. 4A and 4B, contain a flow diagram depicting the operations of, and messages transmitted among, the various portions of the network depicted in FIG. 1 in response to a call release request to a mobile subscriber.
Figure 4B:
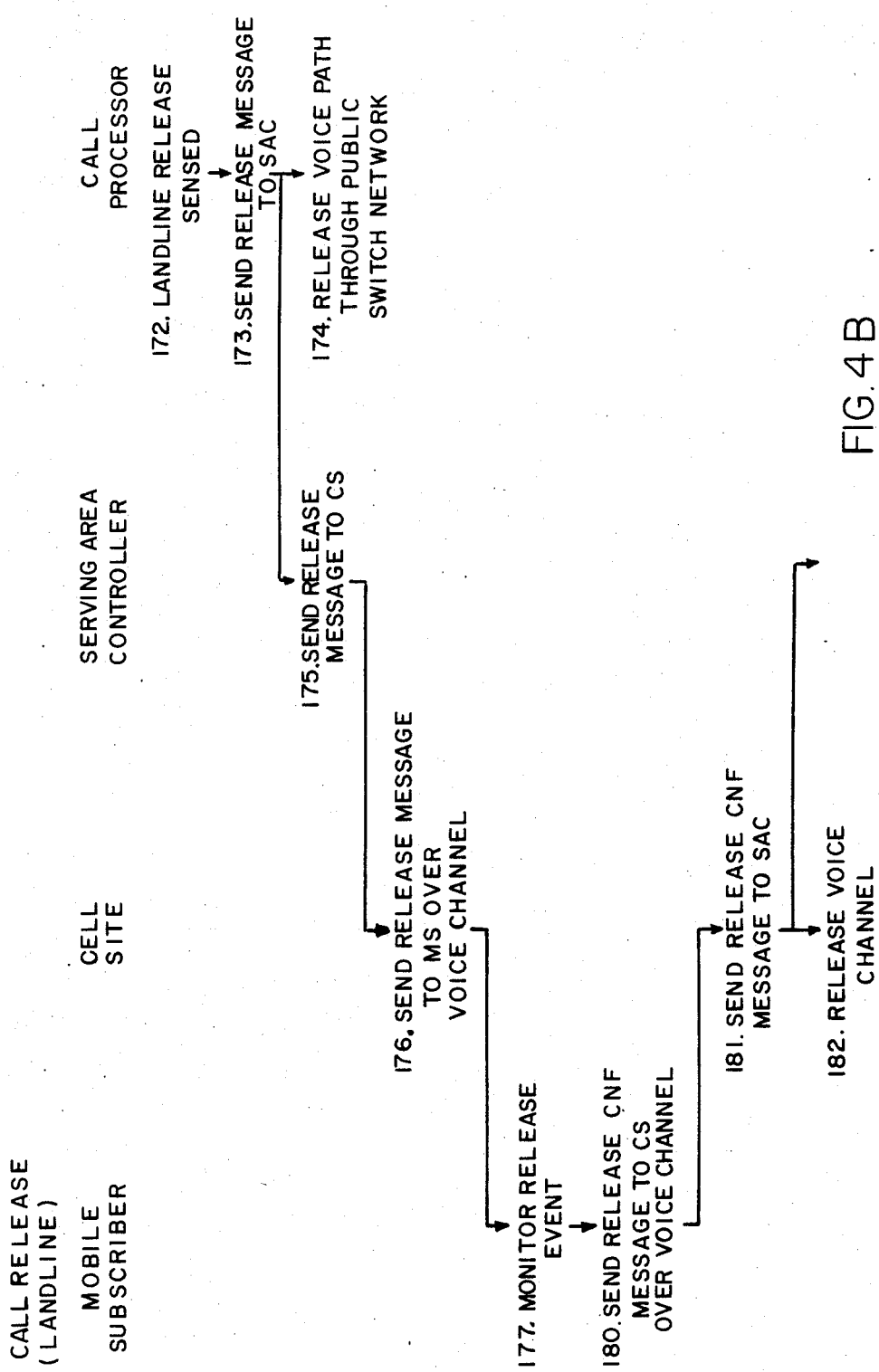
Figure 4C:
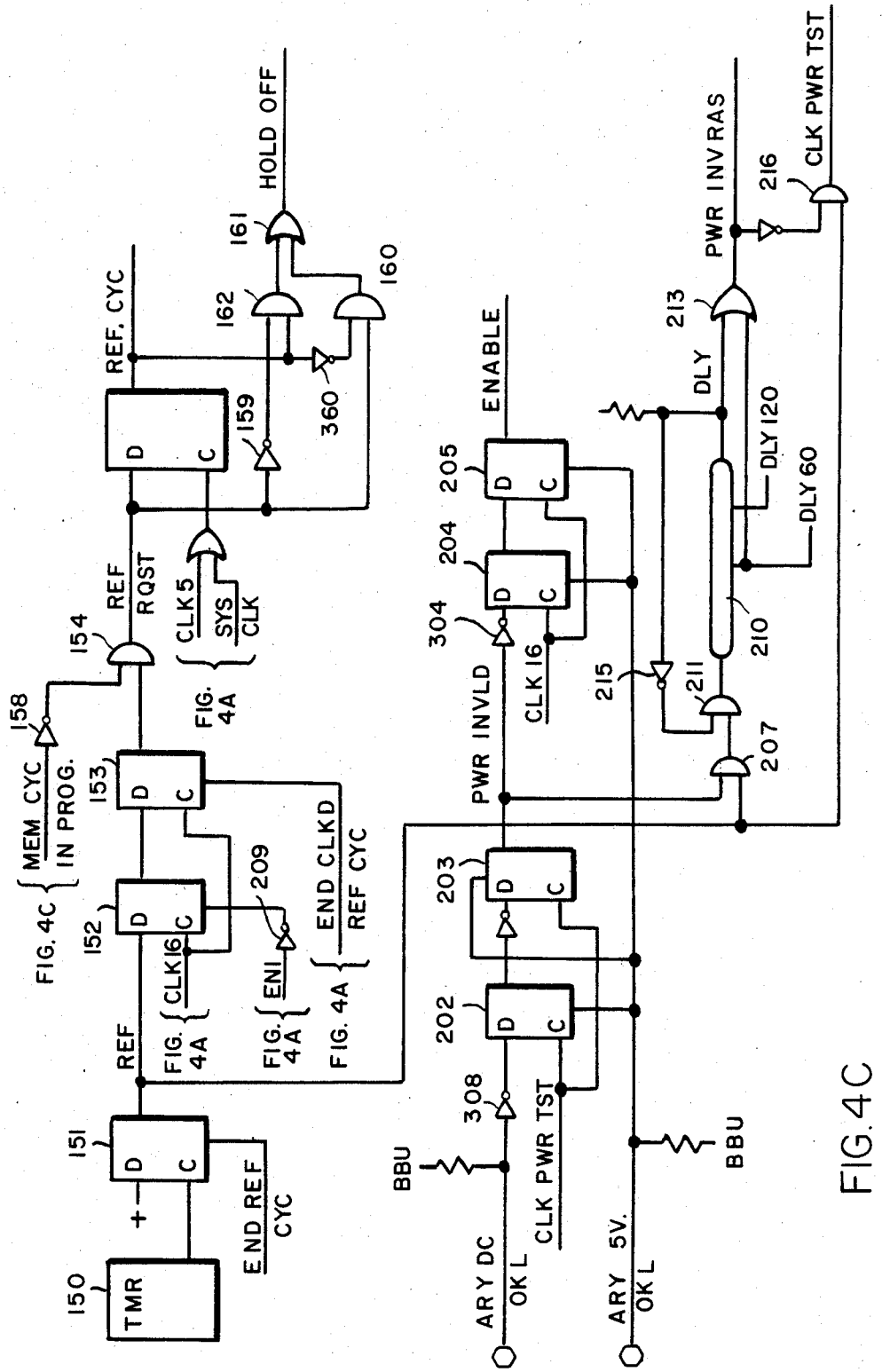
Figure 4C:
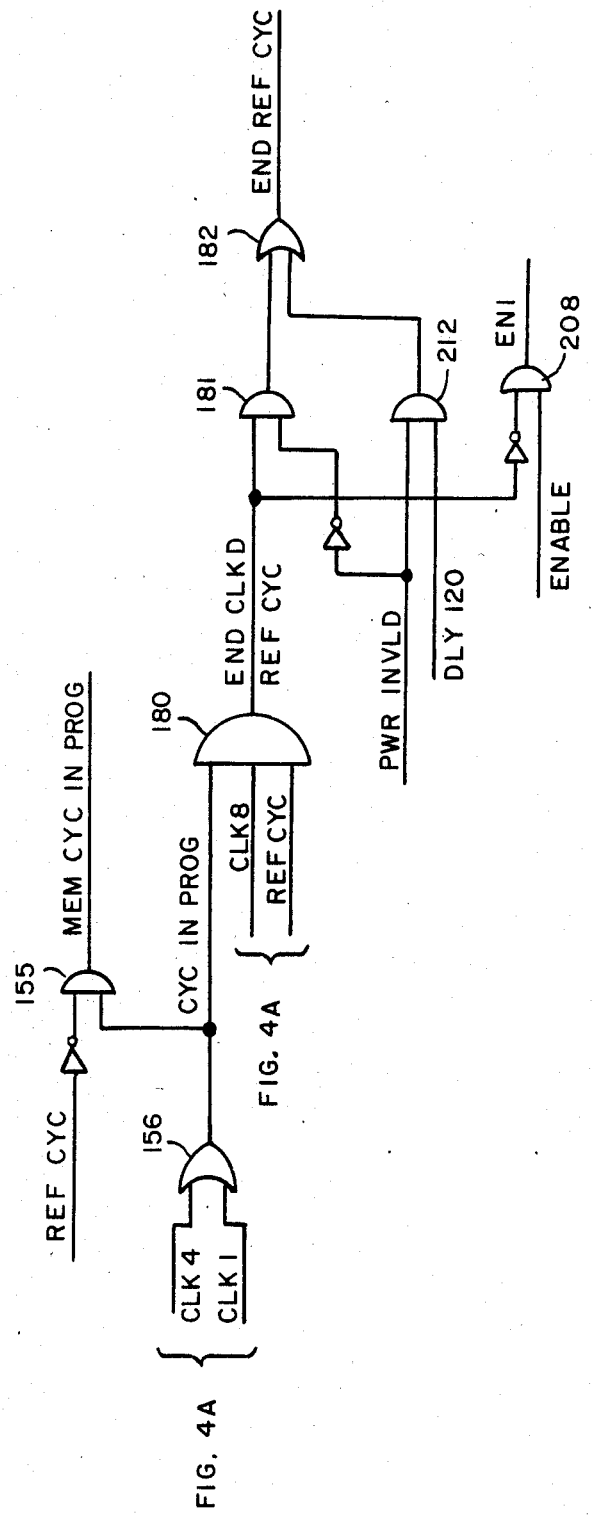

Call release will be described in connection with FIGS. 4A and 4B, with FIG. 4A permitting the operations that occur when the mobile subscriber goes on-hook first, and FIG. 4B presenting the operations that occur when a land-line subscriber goes on-hook first. With reference to FIG. 4A, when the mobile subscriber goes on-hook, it transmits a release message to the cell site over the up-link access portion of the voice channel (step 163). The cell site (in step 164) and serving area controller 44 (in step 165) relay the release message to the call control processor 16, which releases the voice path through the public switch network, and particularly through the time slot interchange matrix switch network 18 (step 166). The call control processor 16 then sends a release confirmation message to the serving area controller 44 (step 167), which relays it to the cell site 12 (step 170). The cell site 12 then releases the voice channel and the trunk to the central office that had been used for the call (step 171). At that point, the voice channel and trunk may be used for another mobile call.

With reference to FIG. 4B, when the call involves a landline subscriber release, the call control processor 16 senses the release in a conventional manner (step 172). In response, it sends a release message to the serving area controller 44 (step 173) and then releases the voice path through the public switch network (step 174).

When the serving area controller 44 receives the release message, it relays it to the cell site 12 (step 175) which relays it to the mobile subscriber (step 176) over the voice channel. The mobile subscriber monitors the release event (step 177) and performs conventional operations in response thereto to notify the operator of the release. The mobile subscriber also sends a release confirmation message to the cell site over the voice channel (step 180). The cell site then relays the release confirmation message to the serving area controller 44 (step 181) and releases the voice channel and trunk to the central office which was carrying the call (step 182).

It will be appreciated by those skilled in the art that the operations described in FIG. 4B will also be performed in response to a release event initiated by a mobile subscriber in connection with a mobile-to-mobile call for the mobile subscriber which does not initiate call release.

While a call is in progress, the cell site, specifically the cell site controller 32, continually monitors the strength of the signal from the mobile subscriber, and, when it gets below a selected threshold level, requests hand-off to another cell. The operations performed in connection with hand-off will be described in connection with FIG. 5, including FIGS. 5A through 5F.

The cell site measure of signal strength is the signal to noise ratio of the up-link signal from the mobile subscriber over the voice channel. The signal to noise ration is continually measured by the transceivers and reported to the cell site controller 32 (step 183). As long as the signal to noise ratio is above a selected level, no action is taken. However, if the signal to noise ratio falls below a selected threshold level (step 184), the cell site transmits a hand-off request message to the serving area controller 44 (step 185). The hand-off request message includes the measured signal to noise ratio and the identification of the cell site which transmitted the hand-off request message.

In response to the receipt of the hand-off request message, the serving area controller 44 sends signal test messages to all of the cell sites 12 adjacent to the cell site from which it received the hand-off request message (step 186). These messages request the adjacent cell sites to perform signal-to-noise ratio measurements on the mobile subscriber.

In response to the signal test messages from the serving area controller 44, each adjacent cell site 12 proceeds to step 187 and measures the signal to noise ratio of the signal from the mobile subscriber, and then sends a message to the serving area controller 44 reporting the measured signal-to-noise ratio (step 190).

After a selected time interval, if the serving area controller 44 receives a report message from a cell site with an acceptable signal to noise ratio, it identifies the cell site with the highest reported signal-to-noise ratio (step 191) and sends a message to that cell site requesting a voice channel and trunk for the call. The cell site 12 determines whether it has a free voice channel and trunk (step 192), and, if not, it ignores the message (step 193). The serving area controller 44, if it receives no response after a preselected time period, sends a similar message to the cell site 12 with the next highest reported signal-to-noise ratio (step 194). This sequence continues until a cell site has a voice channel and trunks which it can allocate to the call. That cell site 12 returns a message to the serving area controller 44 identifying the voice channel and trunk (step 195).

On receiving a message from a cell site indicating a free voice channel and trunk, the serving area controller 44 sends a message to the call control processor 16 requesting a conference circuit between the trunks from the cell site 12 currently handling the call and the selected cell site (step 196). A conventional conference circuit at the central office is used to allow voice information to be transferred between the other part and the mobile subscriber through both cell sites to ensure continuity of voice transmission during hand-off. The serving area controller 44 also sends message to the other cell sites which sent report messages, that is, those which were not selected, that they will not be used for the hand-off (step 197), allowing them to free any reserved voice channel and trunk for other calls (step 198).

In response to the conference request message, the call control processor 16 establishes the requested conference circuit (step 199) and sends a message to the serving area controller 44 confirming establishment of the conference circuit (step 200). The serving area controller 44 then sends hand-off confirmation messages to both the current cell site and the selected new cell site to initiate and synchronize the hand-off (step 201).

Figure 5B:
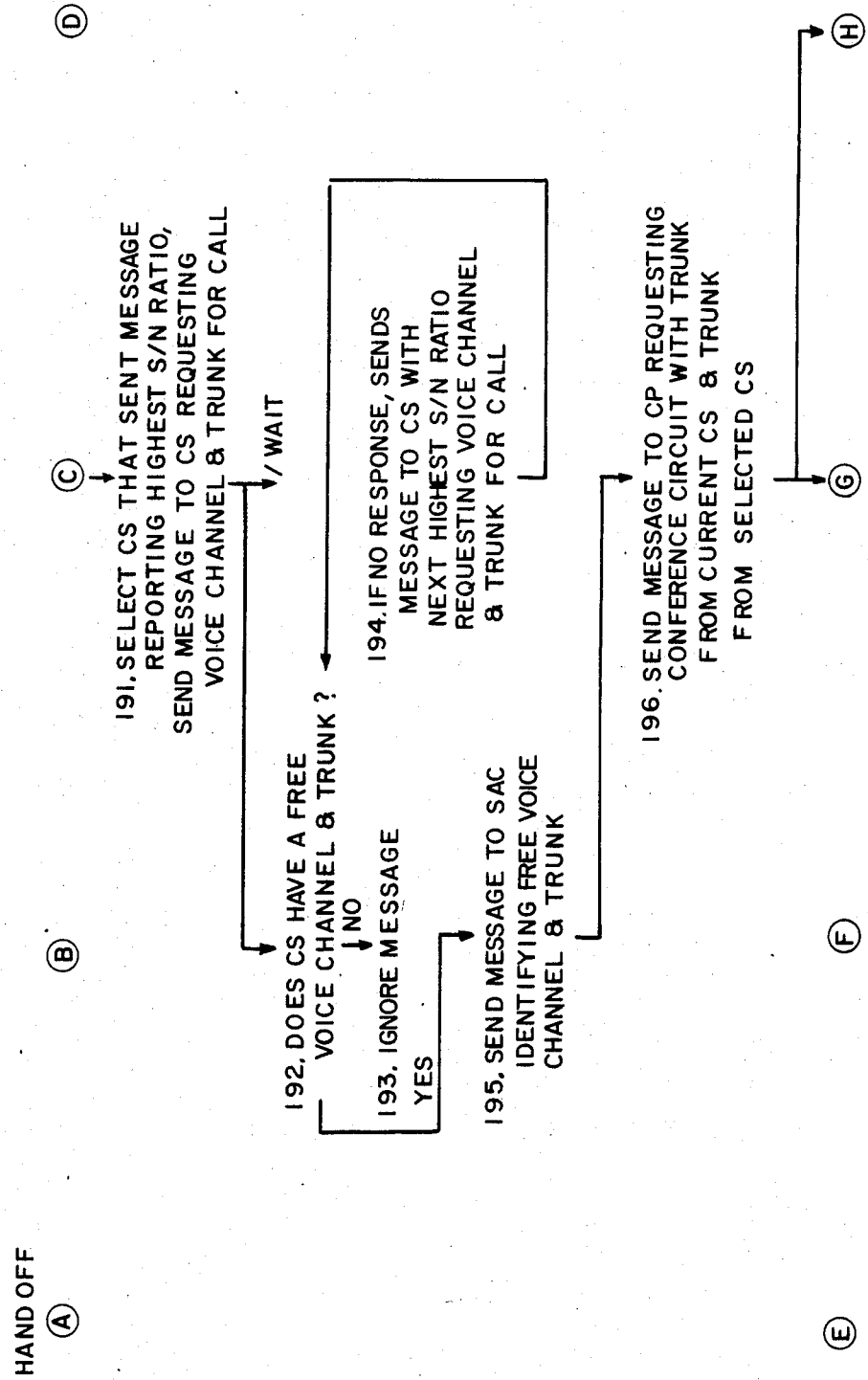
FIG. 5, comprising FIGS. 5A through 5F, contain a flow diagram depicting the operations of, and messages transmitted among, the various portions of the network depicted in FIG. 1 in response to a handoff request.
Figure 5C:
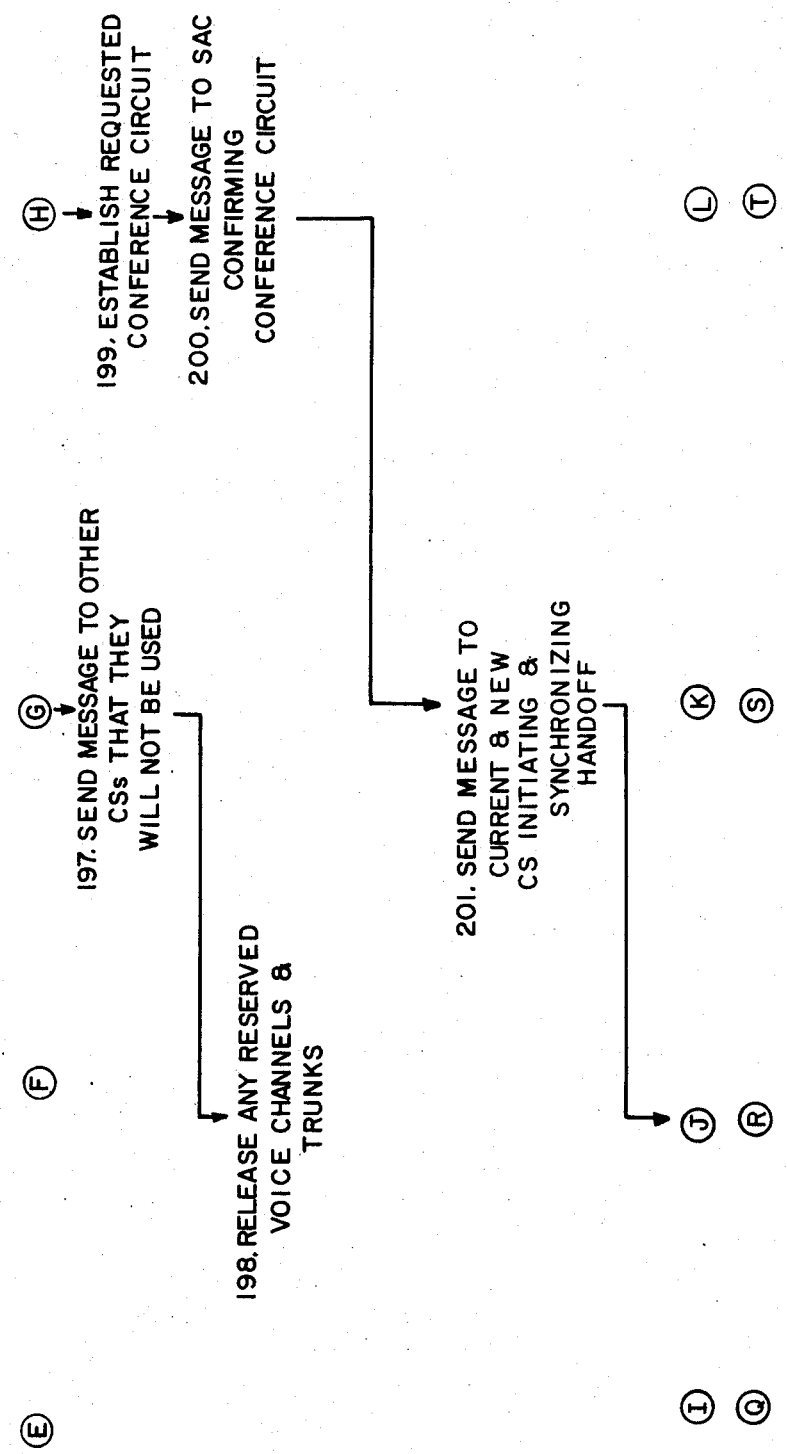
Figure 5D:
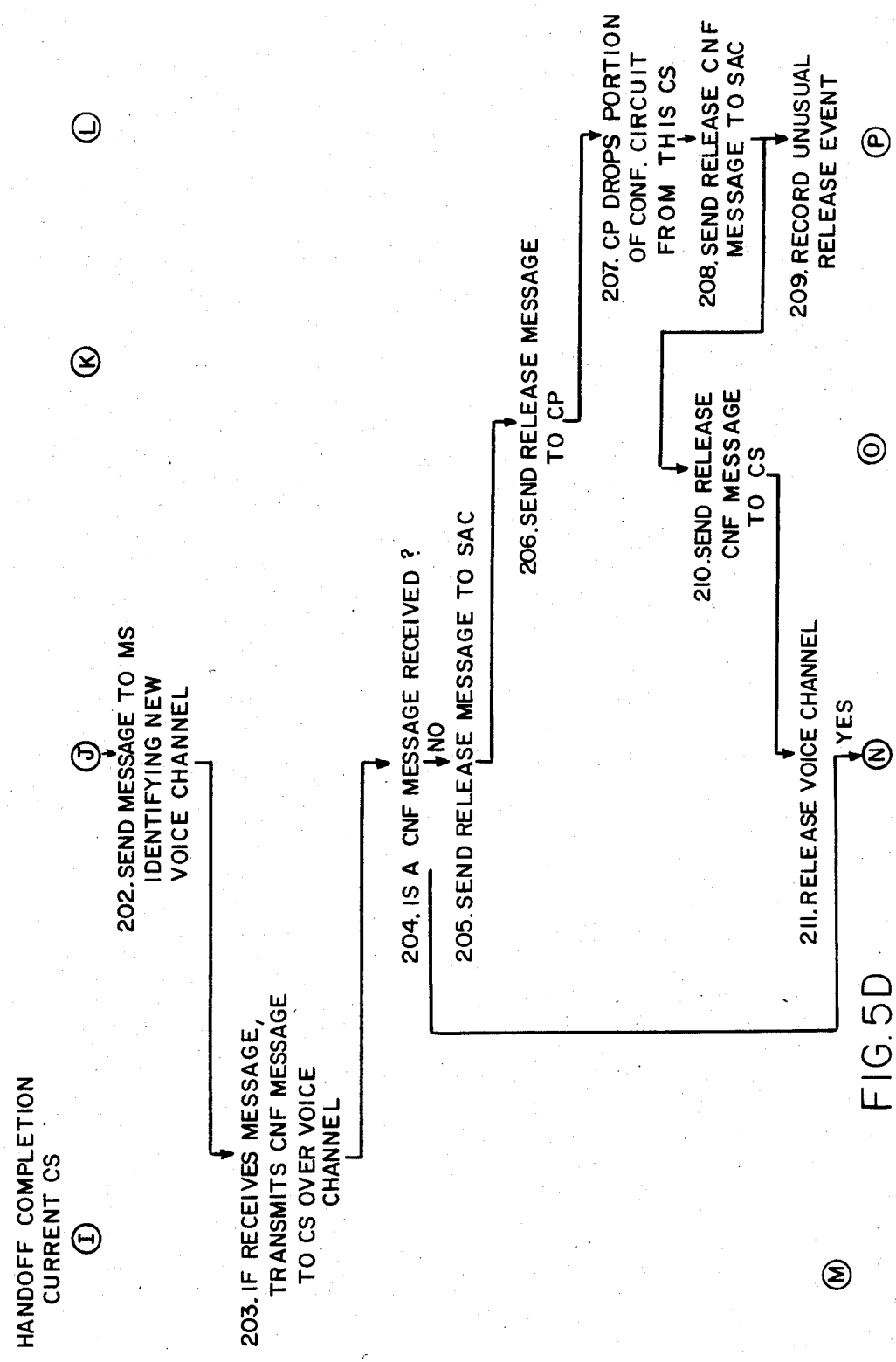

The current cell site, in response to the hand-off confirmation message from the serving area controller 44, sends a hand-off message to the mobile subscriber identifying the new voice channel (step 202) (FIG. 5D). It sends this message over the voice channel. If the mobile subscriber receives the hand-off message, it transmits a hand-off confirmation message over the voice channel (step 203). If the current cell site does not receive the hand-off confirmation message (step 204), it sends a "lost mobile subscriber" message to the serving area controller 44 (step 205). This may occur either because the mobile subscriber did not receive the hand-off message or because the confirmation was too weak to be received by the cell site.

The serving area controller 44 relays the lost mobile subscriber message to the call control processor 16 (step 206), which releases the portion of the conference circuit, that was established in step 183, from the current cell site (step 207), sends a release confirmation message to the serving area controller 44 (step 208) and records the event in an error file (step 209). The serving area controller 44 relays the release confirmation message to the current cell site 12 (step 210), which then releases the voice channel and trunk to the central office (step 211).

If, in step 204, the hand-off confirmation message was received from the current cell site 12, the current cell site sends a release message to the serving area controller 44 (step 212). The serving area controller 44 then relays the release message to the call control processor 16 (step 213), which drops the portion of the conference circuit from the current cell site (step 214). The call control processor 16 then sends a release confirmation message to the serving area controller 44 (step 215), which relays it to the current cell site 12 (step 216). The current cell site then releases the voice channel (step 217).

Figure 5E:
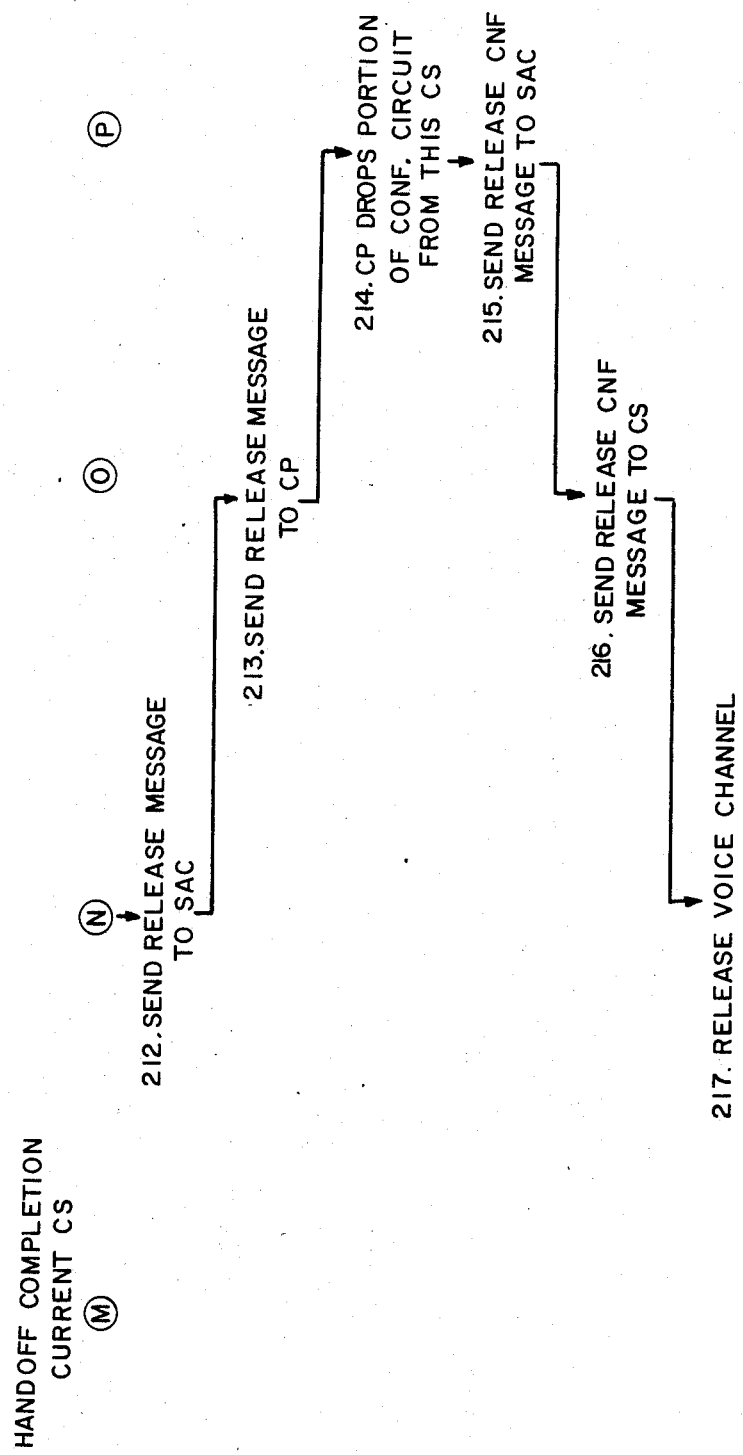
Figure 5F:
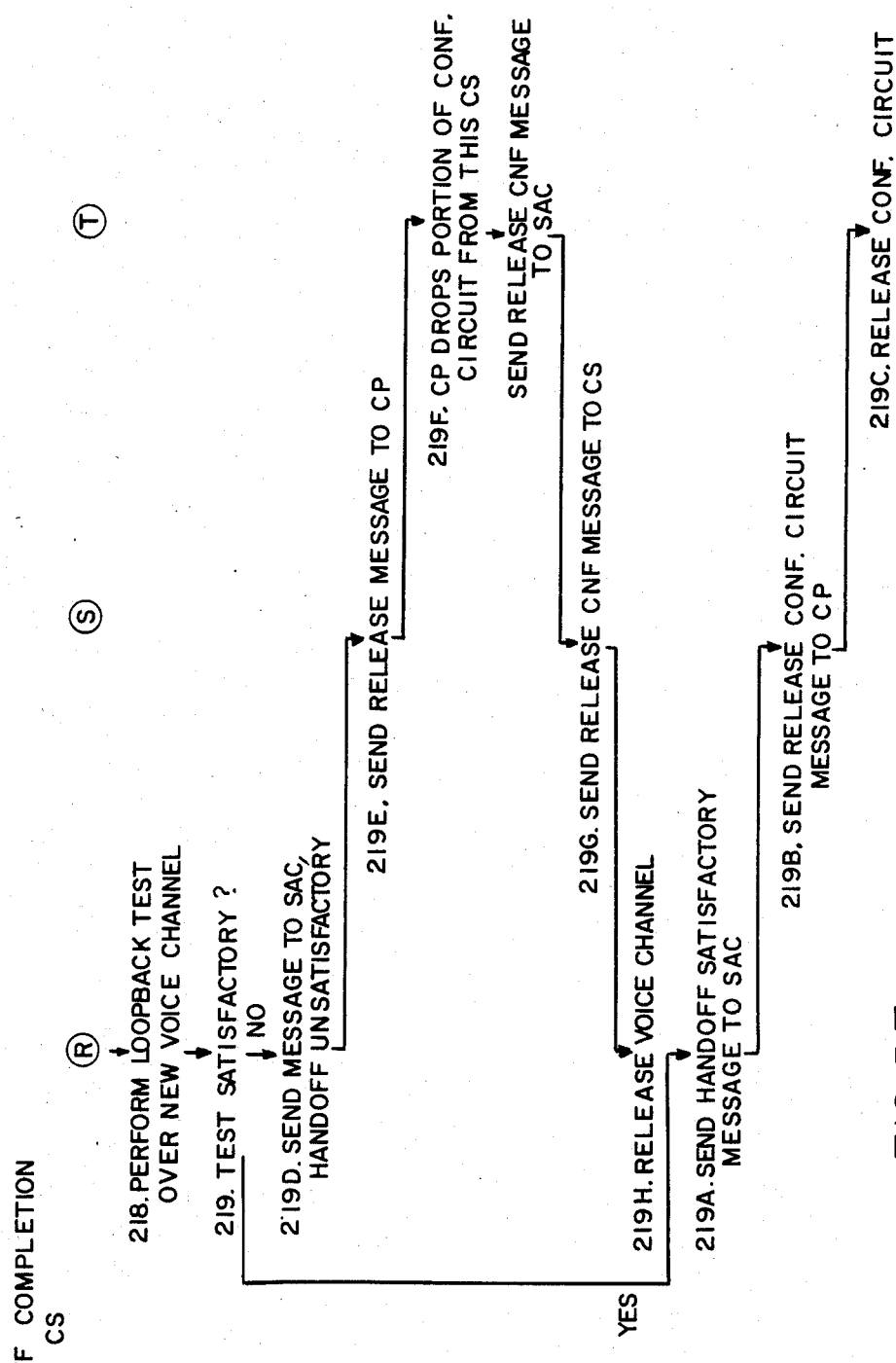

With reference to FIG. 5E, in response to the hand-off message from the serving area controller 44 (step 201, FIG. 5C), the new cell site performs a loopback test to test the voice channel on the mobile subscriber (step 218). If the test is satisfactory (step 219), the new cell site sends a hand-off satisfactory message to the serving area controller 44 (step 210). The serving area controller 44 informs the call control processor 16, which moves the call from a conference circuit to a conventional non-conference connection to the central office. The cell site 12 sends a message to the serving area controller 44 indicating that the handoff is satisfactory (step 219A). In response, the serving area controller 44 sends a release conference circuit message to the call control processor 16 (step 219B), which then releases the conference circuit (step 219C). At this point, the handoff is completed satifactorily.

If the test in step 212 was not satisfactory, the new cell site 12 sends a message for the serving area controller 44 that the hand-off was unsatisfactory (step 219D). In response, the serving area controller 44 sends a release message to the call control processor 16 (step 219E), which drops the portion of the conference circuit reserved for voice communications from this cell site (step 219F) and sends a release confirmation message to the serving area controller 44. The serving area controller 44 relays the release confirmation message to the new cell site (step 219G), which releases the voice channel and trunk that had been reserved for the call hand-off (step 219H).

With this background, the structure and operations of the data link controller (host) 42 will be described, along with the interface between the data link controller (host) 42 and the serving area controller 44. The data link controller (remote) 34 is similar to the data link controller (host) 42, and the interface between the data link controller (remote) 34 and the cell site controller 32 is also similar to the interface between the data link controller (host) 42 and the serving area controller 44.

Figure 6:
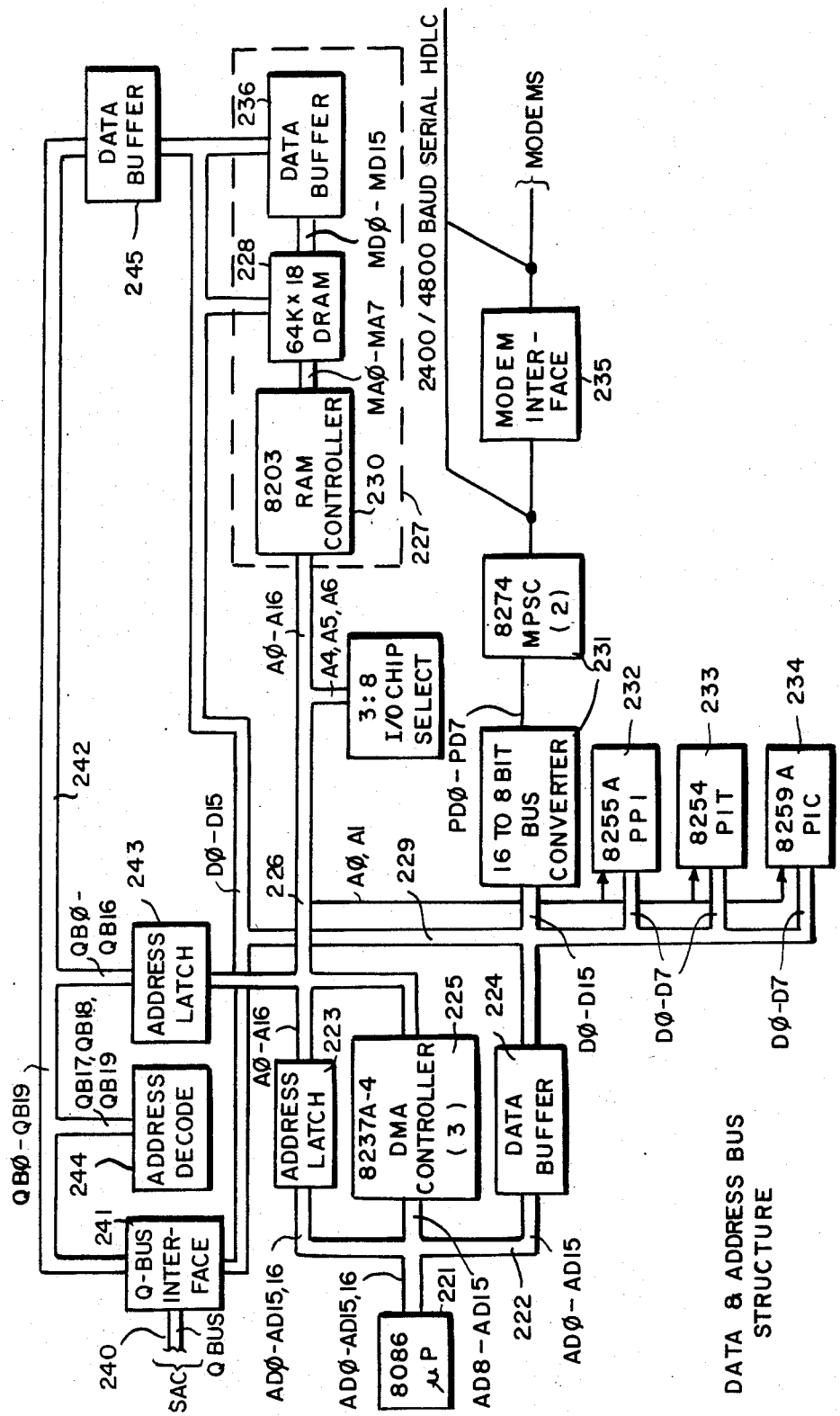
FIG. 6 contains a block diagram detailing the functional parts of a data link controller at the switching office depicted in FIG. 1.

The data link controller (host) 42 and serving area controller 44 communicate through a shared memory in the data link controller (host) 42. With reference to FIG. 6, the data link controller (host) 42 is controlled by a microprocessor 221 connected through a bus structure 222 to an address latch 223, a data buffer 224 and a DMA (direct memory access) controller 225. In one specific embodiment, the microprocessor is a model 8086 microprocessor sold by Intel, Inc., which multiplexes address and data signals on the same outputs. The address latch 223 and data buffer 224 demultiplex the signals for use in the rest of the data link controller (host) 42. The DMA controller also receives address signals from microprocessor 221 and, in response to selected encodings of the address signals, controls certain DMA functions as explained hereinafter.

The address latch 223 places an output address signal on an address bus 226, which distributes address signals to a memory 227, specifically to the memory controller 230, as well as to a programmable serial interface 231, a programmable peripheral interface 232, a programmable timer 233 and a programmable interrupt controller 234. The memory controller receives the address signals and couples them in the conventional multiplexed row and column address format to a set of random access memory RAM integrated circuit chips 228, along with a direction control (that is, a write enable) signal. The RAMs are also connected to a data bus 229 and, if the operation is a write operation, they receive the write data therefrom. The write data may have come from the data buffer 224, from the serial interface 231, or, as explained below, from the serving area controller 44. If, on the other hand, the memory operation is a read operation, the RAMs couple the read data to a data buffer 236, which is also connected to the data bus 229. The read data is then available to the device which initiated the read operation from the data buffer 236.

The serial interface 231 connects to a modem interface 235 which, in turn, connects to a modem 40. In one specific embodiment, a single data link controller (host) 42 can connect to up to four modems 40 through separate modem interfaces 235. Each modem 40 can transmit to and receive from one cell site 12.

The DMA controller 225 operates as an arbitrator among the microprocessor 221, the serving area controller 44 and the serial interface 231, as to which can make a DMA transfer at any given time. When the serving area controller 44 or serial interface 231 are to make DMA transfers, the DMA controller transmits a DMA REQUEST signal (not shown) to the microprocessor 221. When an acknowledgement signal is received from the microprocessor, the DMA controller then permits a DMA operation to proceed.

The serial interface transfers data between the memory 227 and modem interface 235 in a direct memory access operation. That is, the microprocessor 221 transmits an address encoded to identify a control register (not shown) for the serial interface, as well as data corresponding to the control information for that register. Depending on the registers for the specific embodiment, several registers may have to be loaded with such information as the starting address in memory 227 for data to be transferred to the cell site or to receive data from the cell site, the number of bytes to be transferred, the direction of transfer (that is, whether to or from the cell site), the particular protocol to be used, and so forth. When the microprocessor has loaded all of the registers the transfer operation can take place between the serial interface 231 and the memory 227 without intervention by the microprocessor 221.

The programmable peripheral interface circuit 232 is used for several operations, including enabling one of a pair of redundant modems connected to each cell site 12, activating certain integrity checks (such as loopback tests) on the cell site communications through each of the redundant modems, as a status register for indicating the status of various bus operations that can be read by the microprocessor 221, and for generating an interrupt request signal that interrups the serving area controller 44.

The programmable interrupt controller 234 supplies an interrupt vector which enables the microprocessor 221 to service an interrupt request. The interrupt controller 234 generates the vector in response to an interrupt request from serial interface 231, which can occur at the end of a transfer to or from a cell site, or from the programmable interval timer 233.

As has been mentioned, the serving area controller 44 communicates with the data link controller (host) 42 by making DMA transfers to and from memory 227. In one specific embodiment, the serving area controller 44 is controlled by a PDP11/23 (also known as an LSI11) microprocessor solid by Digital Equipment Corporation. That microprocessor has an input/output bus known as a Q-bus 240, which connects to the data link controller (host) 42 through an interface 241. The Q-bus 240, like bus 222, multiplexes data and address signals over the same lines, and interface 241 demultiplexes them to permit them to be transferred over data bus 229 and an address bus 242. The address bus is connected to an address latch 243 which receives and stores the address signals and an address decode circuit 244 which enables the address signals to be stored if the address signals on address bus 242 identify a location within the data link controller (host) 42.

The address bus 242 and data bus 229 are both connected to a multiple-location data buffer 245 which receives and buffers data from the interface 241 when the serving area controller 44 is to store data in the memory 227, and receives data from memory 227 for retrieval by the serving area controller 44 during a reading operation by the serving area controller 44. These operations occur when the address latch 243 receives an address from the address bus 242 and address decode circuit 244 determines that the address identifies a location on the data link controller (host) 42.

Figure 7:
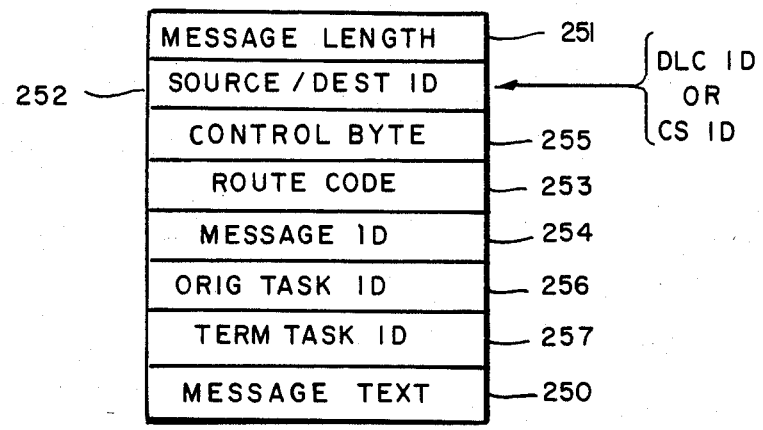
FIG. 7 depicts the formats of messages between the serving area controller and the data link controller at the switching office depicted in FIG. 1.

FIG. 7 presents the structure of the messages that are transmitted between the serving area controller 44 and the data link controller (host) 42. The message includes a variable length message field 250, and so it begins with message length field 251 which identifies the length of the message. A route code field 253 identifies the direction of the message, that is, whether the message is to the serving area controller 44 or to the data link controller (host) 42. A field 252 identifies the source, if the message is from a cell site or the data link controller (host) 42, of the message or the destination, if the message is to a cell site or the data link controller (host) 42. The data link controller (host) 42 monitors the field and, if the message is to the data link controller (host) 42, it uses the message itself rather that send it to a cell site 12. A message identification field 253 carries a control number generated by a counter (not shown) at each cell site and on the data link controller (host) 42 to ensure that messages are properly received. In one embodiment, the other fields, including a control byte field 255, and originating task and terminating task identification fields 256 and 257, are all zero.

Figure 9:
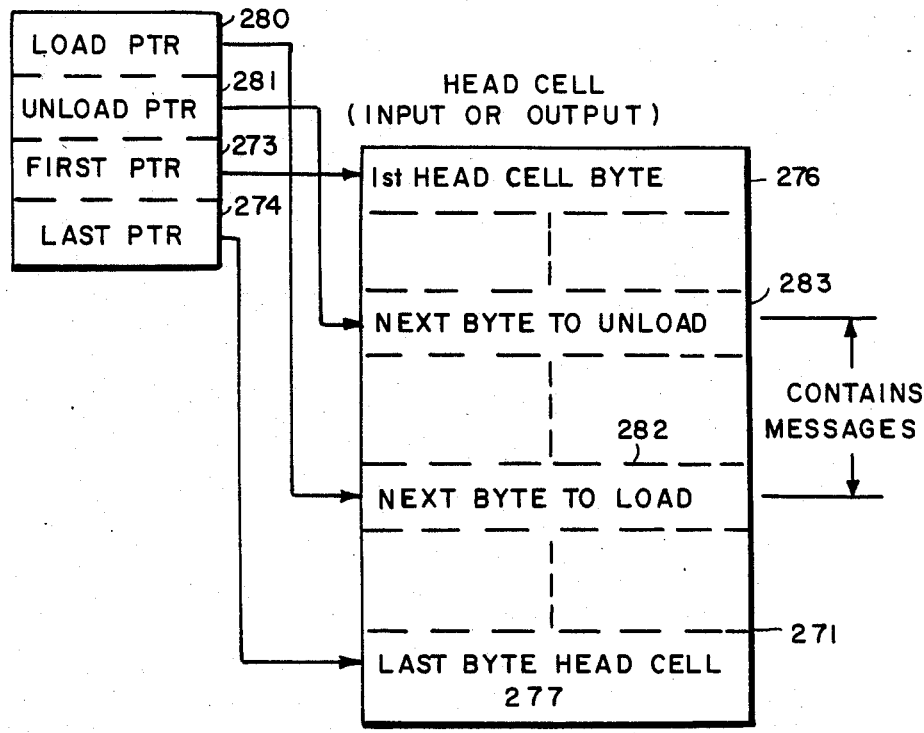
FIGS. 8 and 9 depict various functional data structures maintained for communications between the serving area controller and the data link controller at the switching office depicted in FIG. 1.
Figure 8:
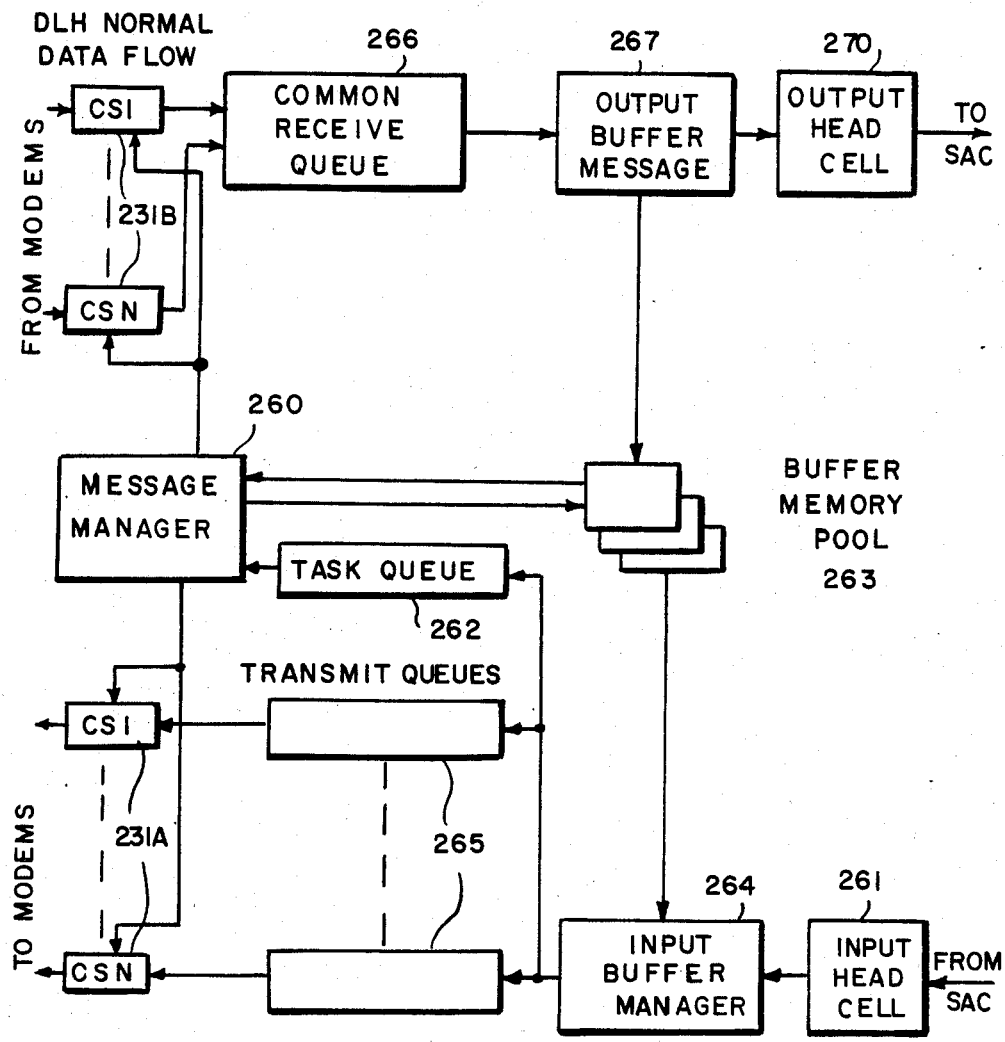

FIGS. 8 and 9 depict various data structures used by the data link controller (host) 42 in managing message transfers between the serving area controller 44 and the cell sites 12. With reference to FIG. 8, a message manager control module 260 that controls message flow through the data link controller (host) 42. A message from the serving area controller 44 is first received in an input head cell buffer 261.

After the serving area controller 44 has placed a message in the input head cell 261, the message manager enables an input buffer manager 263 to determine the intended destination of the message. The input buffer manager examines the contents of the source/destination identification field 252 (FIG. 7) and determines whether the destination is the data link controller (host) 42 or a cell site 12, and if a cell site which of the cell sites 12 is to receive the message. The input buffer manager 264 couples the message to a task queue 262 or to a transmit queue, generally designated by reference numeral 265, associated with each cell site 12. Messages that are sent to the task queue may, for example, enable the data link controller (host) 42 to perform certain maintenance or diagnostic checks on the modems 40 or the control links to the cell sites 12 over trunks 30 and through modems 36. The tasks in the task queue may enable the message manager 260 to control or allocate buffers in a buffer memory pool 263 in memory 227 (FIG. 6).

After a message for a cell site 12 has been sent to the appropriate transmit queue 265, the message manager 260 enables the interface 231A, which represents the portion of interface 231 (FIG. 6) which transmits messages to the cell sites.

A message from a cell site is received by the respective interface 231B and is transferred, under control of message manager 260 to a common receiving queue 266. An output buffer manager 267 enables the messages in the common receiving queue 266 to be transferred seriatum through an output head cell 270 to the serving area controller 44.

FIG. 9 illustrates the structure of one of the head cells 261 and 270, including the control data structure therefor. The input and output head cells 261 and 270 are identical and so only one will be described. A head cell is a buffer 271 in memory 227 (FIG. 6) that is defined by a control block 272, which is also in memory 227. The control block 272 and the buffer 271 are both accessible by the serving area controller 44 and the microprocessor 221 that controls the data link controller (host) 42. The control block 272 includes pointers 273 and 274 whose contents identify the first and last locations in the buffer 271. That is, pointer 273 contains the address in memory 227 of the beginning of buffer 271, or location 276 labelled "1ST HEAD CELL BYTE". Similarly, pointer 274 contains the address in memory 227 of the end of buffer 271, or the location labelled "LAST BYTE HEAD CELL".

The control block 272 also includes a load pointer 280 and an unload pointer 281. The load pointer 20 identifies the next location 282 in buffer 271 to be written by the serving area controller 44, if the head cell is input head cell 261, or by the output buffer manager 267 (FIG. 8) if the head cell is output head cell 270. The unload pointer identifies the next location to be read by the respective serving area controller 44 or output buffer manager 267.

Figure 10B:
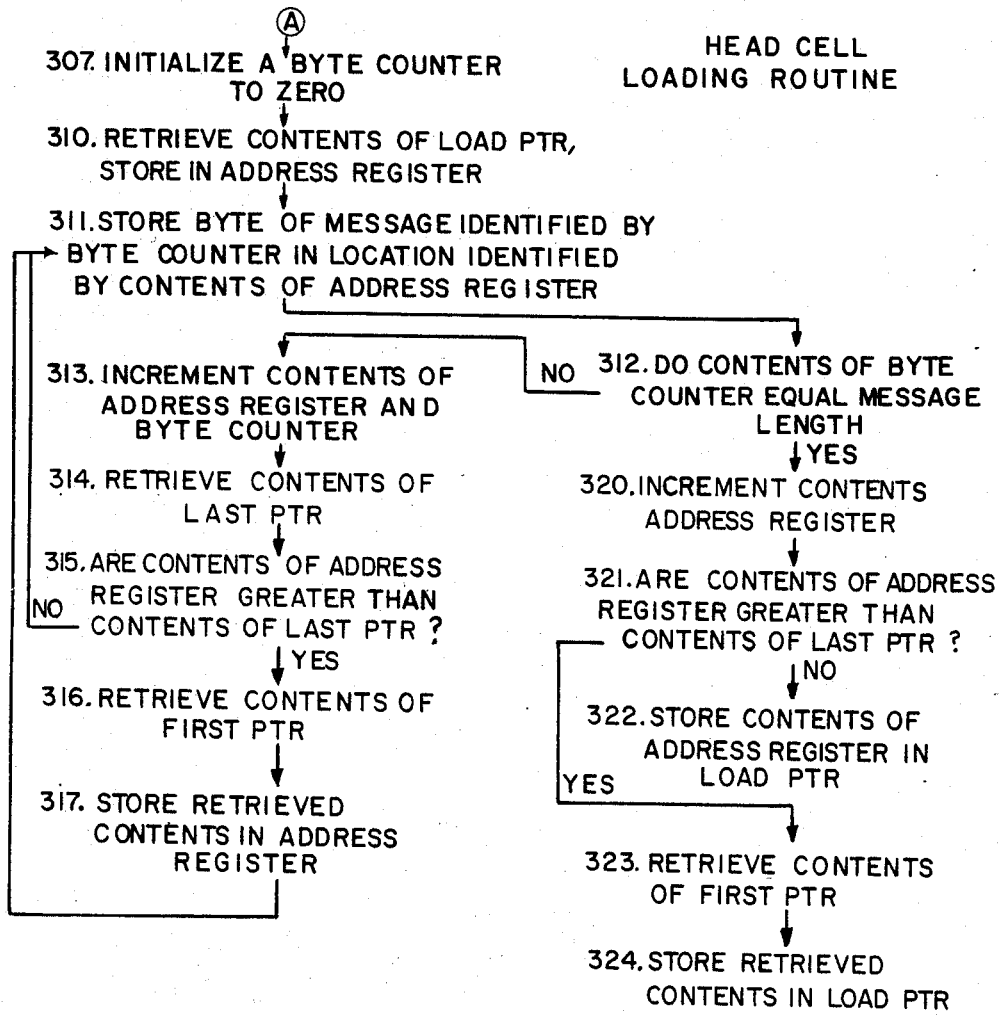
FIG. 10, comprising FIGS. 10A and 10B, contain a flow diagram detailing the use of those data structures.

The buffer 271 is operated as a circular buffer with the locations between the next byte to unload 283 and the next byte to load 282 containing messages to be retreived by the respective serving area controller 44 or input buffer manager 264 (FIG. 6). The rest of the buffer 271 is available for loading by the respective serving area controller 44 or output buffer manager 267. FIGS. 10A and 10B detail, respectively, the procedures for loading the head cells 261 and 270.

With reference to FIG. 10A, the contents of the load pointer 280 and unload pointer 281 are first compared (step 300). If the contents of the load pointer are greater than the contents of the unload pointer, the available space in buffer 271 (FIG. 9) is at the end of the buffer between the next byte to load 282 and the last byte 277, and at the beginning of the buffer between the first byte 276 and the next byte to unload 283. In that case, the element loading the head cell, that is either the serving area controller 44 or the output buffer manager 267 (FIG. 8) subtracts the contents of load pointer 280 from the contents of the last pointer 274 to obtain the available space at the end of the head cell buffer 271 (step 301). Next, the contents of the first pointer 273 are subtracted from the contents of the unload pointer 281 to obtain the available space at the beginning of the head cell buffer 271 (step 302). These two values are then summed to obtain the entire available space (step 303).

If, on the other hand, in step 300 it was determined that the contents of the unload pointer 281 were greater than the contents of the load pointer 280, the available space would be between the locations in buffer 271 identified by the two pointers. The contents of the load pointer are subtracted from the contents of the unload pointer to obtain the amount of space available for the message (step 304).

The amount of space available in buffer 271 is then (step 305) compared to the length of the message in field 251 (FIG. 7). If the message length if greater than the amount of buffer space available, the attempt to load the buffer 271 is aborted, and may be retried later (step 306). If the message length is less than the amount of buffer space available, a byte counter is first initialized to zero (step 307) and the contents of the load pointer 280 are retrieved and stored in an address register (not shown) (step 310). The message byte identified by the byte counter is stored in the location in buffer 271 identified by the contents of the address register (step 311).

If the contents of the byte counter do not equal the message length (step 312), there are more bytes of the message to be stored in the buffer 271. The contents of the address register and byte counter are incremented (step 313) and the contents of the address register are then compared to the contents of the pointer 274 to the last location in buffer 271 (steps 314 and 315). If the contents of the address register are not greater than the contents of pointer 274, the sequence returns to step 311. However, if the contents of the address register are greater than the contents of pointer 274, the contents of the pointer 273 to the beginning of buffer 271 are retrieved (step 316) and stored in the address register (step 317), after which the sequence returns to step 311. Steps 316 and 317 permit the buffer 271 to be circular; when the contents of the address register indicate that the next location to be loaded is beyond the last location in the buffer, which is determined in step 315, the sequence loads the address of the first location in the buffer, which is identified by the contents of pointer 273, into the address register before it continues.

When, in step 312, it is determined that the contents of the byte counter equal the message length field 251 (FIG. 7), the message has been completely loaded into the head cell buffer 271. The contents of the address register are incremented (step 320) then compared to the contents of the pointer 274 (step 321). If the contents of the address register are not larger than the contents of the pointer 274, the contents of the address register are loaded into the load pointer 280 as the next location to be loaded (step 322). However, if the contents of the address register are larger than the contents of the pointer 274, the contents of the pointer 23 are retrieved (step 323) and loaded into the pointer 280 (step 324).

Both the microprocessor which controls the serving area controller 44 and the microprocessor which controls the data link controller (host) 42 periodically poll the respective head cells to determine if there are any messages in them. This is accomplished by retrieving and comparing the respective load and unload pointers 280 and 281 (FIG. 9). If the pointers are the same, the associated buffer 271 is empty; otherwise, there is a message in the buffer.

The structure of the data link controller (remote) 34 and the operation of it and the cell site controller 32 (FIG. 1) are similar to that described in FIGS. 6–10, with the primary differences being that te data link controller (remote) only controls one modem (or actually one pair of redundant modems), and that there are only two buffers allowing message transfers in each direction between the two elements. The two buffers are of different sizes, and the size of a message is limited by the buffer size.

The serving area coontrollers 44 includes data structures which are related to handling of calls with mobile subscribers, including structures relating to the addresses, status and configuration of the cell sites 12 connected to it, including the number and identification of the voice channels that are available through the cell sites and the area codes in which the cell sites are located. FIGS. 11A and 11B detail entries in two data structures that are useful in mobile call processing by the serving area controller 44. FIG. 11A depicts a channel configuration buffer (CCB) which contains selected information about a voice channel that is in use. The channel configuration buffer includes a field which contains a pointer 330 to an entry in a mobile information table detailed in FIG. 11B. The mobile information table entry also has a pointer 331 to the entry in the channel configuration buffer, thus cross-referencing the two entries.

The channel configuration buffer also includes a voice channel identification field 332 which identifies the voice channel referenced by the entry, a class of service field 333 for storing the class of service of the mobile subscriber using the channel, a signal strength field 334 for storing a rating of the strength of the signal over the voice channel, a field 335 for storing the number of responses to a signal strength request message during a hand-off, and a field 336 for storing a pointer to the corresponding channel configuration buffer during a hand-off. In addition, the channel configuration buffer also includes a field 337 for indicating the state of the call. States include:

A. idle,
B. waiting for an answer from the called party,
C. call (conversation) in progress,
D. waiting for release confirmation from either the cell site 12 or the call control processor 16,
E. the channel is reserved for a hand-off,
F. waiting for conference circuit confirmation during hand-off,
G. waiting for h and-off complete confirmation,
H. reserved channel release pending, and
I. call control processor 16 voice channel recovery.

A mobile information table entry, in addition to storing a pointer to the channel configuration buffer entry for the call, also includes a field 340 for the mobile identification number (MIN), a field 341 for the mobile serial number, a field 342 for the call control processor's equipment number for the mobile subscriber, a pointer to the next entry in the table, as well as a field for the state of the call. States include:

A. idle,
B. page in progress
C. call (conversation) in progress,
D. origination directed retry,
E. termination directed retry, and
F. call control processor 16 voice channel recovery.

The foregoing description has been limited to a specific embodiment of this invention. It will be appreciated that the invention provides a new mobile telephone switching office having a division between portions that would come within the regulated public switch network and those that would be used in the unregulated cellular radiotelephone system. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A mobile telephone switching office for switching calls among landline subscribers over landline telephone lines and mobile subsribers over a plurality of cellular radiotelephone voice channels, said mobile telephone switching office including:

A. switch means for performing switching operations among said telephone lines and a plurality of trunk lines;

B. central office processing means for controlling said switch means to provide voice paths between respective lines through said switch means in response to mobile call progress messages and for generating mobile call status messages in response to the status of a call involving a mobile operator, at least one of said mobile call status messages being a termination request message;

C. at least one cell site means connected to at least one of said trunk lines and including:

i. voice transceiving means for generating signals for transmission over said voice channels in response to voice signals from said trunk lines and for receiving signals from said voice channels and generating voice signals for transmission over said trunk lines;

ii. mobile message receiving means for receiving mobile request messages from said mobile subscribers over a paging channel, at least one of said mobile request messages being an origination message;

iii. message transfer means for generating mobile control messages for transfer to said central office processing means and for receiving mobile call status messages from said central office processing means; and iv. control means for selecting a voice channel and a trunk to carry voice signals between said mobile subscriber and said switch means in response to the receipt of an origination message or a termination message.

2. A mobile telephone switching office as defined in claim 1 wherein said central office processing means includes:

A. call processing means for generating switch control signals for controlling said switch means and for generating control messages;

B. communications buffer control means connected to said call processing means for receiving and buffering said control messages;

C. serving area controller means connected to said communications buffer control means for receiving from said communications buffer control means control messages to be transmitted to said cell site; and D. cell site message transmission means connected to said serving area controller means and said switch means for receiving control messages from said serving area controller means and for formatting each control message for transmission through said switch means, said call processing means controlling said switch means to couple the formatted control messages to said cell site to control the cell site.

3. A mobile telephone switching office as defined in claim 2 further comprising maintenance processing means connected to said communications buffer control means for generating maintenance messages which enable the performance of selected maintenance and diagnostic operations, said maintenance processing means transmitting said maintenance messages as maintenance contol messages to said communications buffer control means, said communications buffer control means transmitting said maintenance control messages to said serving area controller means as control messages.

4. A mobile telephone switching office as defined in claim 2 further comprising a plurality of cell site means each connected to at least one of said trunk lines, wherein said serving area controller means includes message generation means for generating in response to said control messages from said communications buffer control means, cell site control messages for transmission to said cell site means and data link means having a plurality of output means, each connected to said switch means and associated with one of said cell site means, for receiving said cell site control messages and coupling them to the appropriate output means.

5. A mobile telephone switching office as defined in claim 4 wherein said data link means further includes a transmit queue means connected to each output means and a message manager means connected to all of said transmit queue means and said output means for controlling the transfer of messages therethrough.

6. A mobile telephone switching office as defined in claim 5 wherein said call processing means further generates data link control messages, said data link means further including a task queue connected to said message manager means for receiving said data link control messages for controlling said message manager means.

7. A mobile telephone switching office as defined in claim 5 wherein said cell site means transmits said mobile control messages over said trunk lines to said switch means, said data link means further including a plurality of input means each connected to said switch means, said call processing means enabling said switch means to couple said mobile control message from each cell site means to a respective input means of said data link means, said data link means further including common receive queue means connected to said message manager means, all of said input means and said serving area controller means for iteratively receiving the mobile control messages from all of said input means and coupling them seriatim to said serving area controller means.

* * * * *